(12) United States Patent
Liu et al.

(10) Patent No.: US 12,394,414 B2
(45) Date of Patent: Aug. 19, 2025

(54) ENTERPRISE TYPE MODELS FOR VOICE INTERFACES

(71) Applicant: Amazon Technologies, Inc., Seattle, WA (US)

(72) Inventors: Austin Chang Ming Liu, Burnaby (CA); Gonzalo Alvarez Barrio, Seattle, WA (US); Gregory James Wade, Coquitlam (CA); Harsh Agarwal, Seattle, WA (US); Sam Anthony Sullivan, Lions Bay (CA); Chieh Chien, Bellevue, WA (US); Cameron L Chinn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 18/082,786

(22) Filed: Dec. 16, 2022

(65) Prior Publication Data
US 2024/0203412 A1 Jun. 20, 2024

(51) Int. Cl.
- *G06N 20/00* (2019.01)
- *G10L 15/06* (2013.01)
- *G10L 15/22* (2006.01)

(52) U.S. Cl.
CPC ............ *G10L 15/22* (2013.01); *G10L 15/063* (2013.01)

(58) Field of Classification Search
None
See application file for complete search history.

(56) References Cited

U.S. PATENT DOCUMENTS

| | | | | |
|---|---|---|---|---|
| 8,261,271 B2 * | 9/2012 | Polizzi | ................ | G06F 16/954 709/201 |
| 8,661,112 B2 * | 2/2014 | Creamer | ............... | H04M 3/493 379/88.16 |
| 10,929,601 B1 | 2/2021 | Trafny | | |
| 11,062,700 B1 | 7/2021 | Azimi | | |
| 2003/0191639 A1 | 10/2003 | Mazza | | |
| 2007/0025808 A1 * | 2/2007 | Penn | ......................... | B42F 7/06 402/75 |
| 2010/0211489 A1 * | 8/2010 | Zhang | .................... | G06Q 30/02 715/702 |
| 2014/0244712 A1 * | 8/2014 | Walters | .................. | H04L 67/10 709/202 |
| 2014/0310002 A1 * | 10/2014 | Nitz | ........................ | G10L 15/22 704/270.1 |

(Continued)

FOREIGN PATENT DOCUMENTS

WO 2008046103 A2 4/2008

OTHER PUBLICATIONS

PCT Search Report and Written Opinion mailed Mar. 21, 2024 for PCT Application No. PCT/US2023/084306 for PCt Summary, 26 pages.

*Primary Examiner* — Jakieda R Jackson
(74) *Attorney, Agent, or Firm* — Nicholson De Vos Webster & Elliott LLP

(57) ABSTRACT

Systems and methods for enterprise type pretrained models for voice interfaces include the generation and validation of enterprise type pretrained models utilizing input associated with the enterprise type at issue. Once generated and validated, when a user command is received, the speech processing system may check to determine if a customized model is available, and if not, may query the enterprise type model to provide a response to the user command.

20 Claims, 10 Drawing Sheets

(56) References Cited

U.S. PATENT DOCUMENTS

| | | | |
|---|---|---|---|
| 2015/0078538 A1* | 3/2015 | Jain | H04M 3/493 |
| | | | 379/88.01 |
| 2016/0098992 A1* | 4/2016 | Renard | G10L 15/30 |
| | | | 704/275 |
| 2017/0236512 A1* | 8/2017 | Williams | G10L 13/02 |
| | | | 381/79 |
| 2017/0278203 A1* | 9/2017 | Mimassi | G06Q 10/02 |
| 2018/0061419 A1* | 3/2018 | Melendo Casado | G10L 25/78 |
| 2018/0144064 A1* | 5/2018 | Krasadakis | G06F 16/90332 |
| 2019/0013019 A1* | 1/2019 | Lawrence | G10L 15/1815 |
| 2019/0082043 A1* | 3/2019 | Lavian | G06F 16/23 |
| 2020/0034492 A1* | 1/2020 | Verbeke | G06F 16/636 |
| 2020/0092319 A1* | 3/2020 | Spisak | G06N 7/01 |
| 2020/0162472 A1* | 5/2020 | Zadeh | G06F 9/44505 |
| 2020/0385011 A1* | 12/2020 | Genussov Ziss | G06V 20/597 |
| 2022/0124000 A1* | 4/2022 | Prasad | G06F 18/24147 |

* cited by examiner

700

```
┌─────────────────────────────────────────────────────────────────────────────┐
│ Receive, from voice interface device, audio data representing user utterance including request │
│ that action be performed, voice interface device associated with account data identifying voice │
│          interface device as being associated with enterprise              │
│                                    702                                      │
└─────────────────────────────────────────────────────────────────────────────┘
                                      ↓
┌─────────────────────────────────────────────────────────────────────────────┐
│ Determine that account data is associated with enterprise type model configured to identify plurality │
│ of enterprise applications to service user requests, wherein enterprise type model is generated based │
│      on enterprise type associated with enterprise, enterprise type indicating industry of enterprise │
│                                    704                                      │
└─────────────────────────────────────────────────────────────────────────────┘
                                      ↓
┌─────────────────────────────────────────────────────────────────────────────┐
│       Rank first enterprise application with other candidate applications to service request │
│                                    706                                      │
└─────────────────────────────────────────────────────────────────────────────┘
                                      ↓
┌─────────────────────────────────────────────────────────────────────────────┐
│ In response to determining that voice interface device is not associated with customized voice │
│ interface model, determine that account data is associated with enterprise type model configured │
│ to service intent, wherein enterprise type model is generated based on enterprise type associated │
│            with enterprise, enterprise type indicating industry of enterprise │
│                                    708                                      │
└─────────────────────────────────────────────────────────────────────────────┘
                                      ↓
┌─────────────────────────────────────────────────────────────────────────────┐
│ Generate, utilizing first enterprise application, speech processing result associated with action to │
│                                be performed                                 │
│                                    710                                      │
└─────────────────────────────────────────────────────────────────────────────┘
                                      ↓
┌─────────────────────────────────────────────────────────────────────────────┐
│           Send, to voice interface device, directive to cause action to be performed │
│                                    712                                      │
└─────────────────────────────────────────────────────────────────────────────┘
```

FIG. 7

ENTERPRISE TYPE MODELS FOR VOICE INTERFACES

BACKGROUND

Devices, including voice interface device, have become available. Some of these devices may be utilized to perform actions in environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a flow diagram of an example process for selecting enterprise type models in response to voice commands received in association with an enterprise voice interface device.

DETAILED DESCRIPTION

Figure 1:
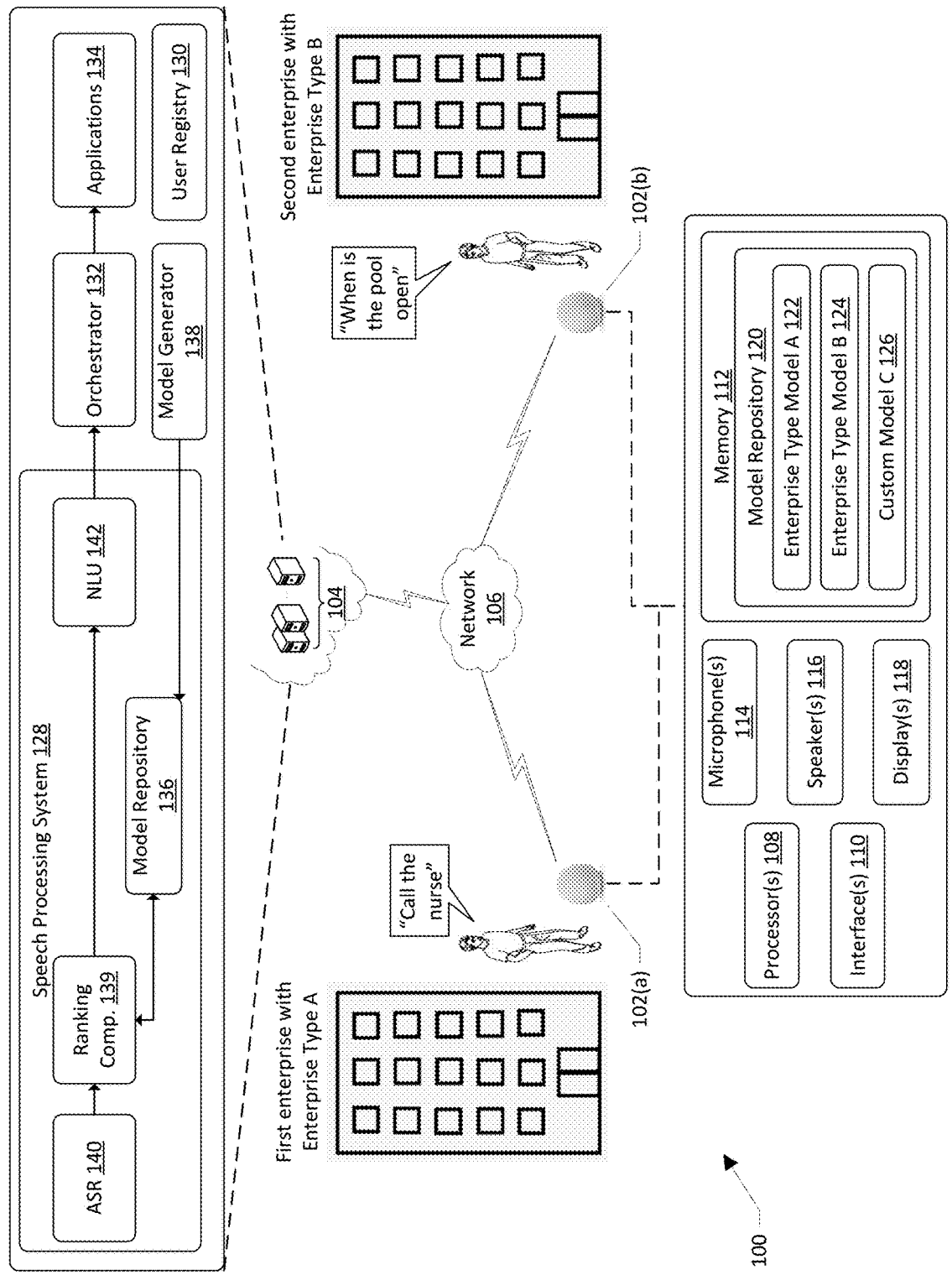
FIG. 1 illustrates a schematic diagram of an example environment for enterprise type models for voice interfaces.

Systems and methods for enterprise type models for voice interfaces are disclosed, among other things. Take, for example, an environment (such as a home, hotel, vehicle, office, store, restaurant, or other space) where one or more users may be present. The environments may include one or more electronic devices that may be utilized by the users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home mode"), smart cameras (e.g., home security cameras), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example.

In these and other scenarios, certain entities, such as enterprise entities, may desire to generate their own voice interface applications for use with voice interface devices associated with the enterprise entities. Such enterprise entities may include, just by way of example, a hospital, a hotel, an apartment complex, a nurse or long-term care home, an office, etc. where the environment(s) associated with these enterprise entities may have a number of associated voice interface devices. While these voice interface devices may be preconfigured to perform certain general or otherwise universal actions such as responding to voice commands of "what's the weather like," "what time is it," "what time is the football game tonight," etc., a given enterprise may desire the voice interface devices to be configured to perform more customized actions specific to the enterprise at issue. Some examples may be that a hotel may want a voice interface application that allows an appropriate answer to be provided to a voice command such as "call the front desk," "what floor is the pool on," "when is the pool open until," and/or other voice commands that are specific to the given enterprise. Generally, to create these voice interface applications (such as "skills"), a good deal of time and money may be expended to generate a customized model that may be utilized to select applications for responding to voice commands. Also, once these customized models are generated, they typically undergo a testing phase to ensure that the customized models work as intended and that the customized models do not negatively impact other operations of the voice interface devices. During this creation and testing phase, the enterprises may rely on the entity-agnostic voice interface applications to respond to voice commands, likely resulting in enterprise-specific voice commands not being fulfilled and/or being fulfilled inaccurately.

Enterprise type models can be generated and utilized sometimes on a temporary basis by enterprises while fully customized models are developed (and/or in place of fully customized models). To do so, a model creation user interface may be displayed, and user input data may be received to select one or more options for generation of the enterprise type model. These options may include, for example, an option to select an enterprise type associated with the enterprise. As used herein, an "enterprise type" refers to a predefined type of enterprise that is engaged in generation of the enterprise type models. Example enterprise types may include, for example, a hotel, a hospital, a long-term care home, an office space, etc. The enterprise user may then be presented with indicators of the subset of voice commands that are relevant to the enterprise type at issue and the user may provide user input data indicating selection of one or more of the voice commands in the subset of voice commands that are desired to be associated with the enterprise type model to be generated. The speech processing system associated with the voice interface devices may then generate the enterprise type model utilizing the enterprise type, the selected voice commands, and the responses and/or actions associated with those voice commands.

The present disclosure describes a system and methods for utilizing the enterprise type models at runtime. For example, during a runtime scenario, audio representing a user utterance may be captured by a voice interface device. Audio data representing the audio may be generated and may be utilized by the speech processing system, and/or by a speech processing application on the voice interface device, to determine a response to the user utterance. This response may include an audio response to the user utterance and/or an action to be performed in response to the user utterance by the voice interface device and/or another device. By way of example, the user utterance may be "what floor is the pool located on." The audio data representing this user utterance may be accompanied by metadata associated with the user utterance, including an identifier of the voice interface device that captured the audio, an indication of whether the voice interface device has a screen or not, and/or other data associated with the voice command.

Once the audio data and/or the metadata is received, automatic speech recognition (ASR) processing may be performed to generate text data representing a textual version of the voice command. At this point, a ranking component may be configured to analyze the text data and determine a ranked list of applications and application types that may be utilized to service the voice command. In examples, the application types may include enterprise-agnostic applications that may be associated with various domains. These enterprise-agnostic applications may not be specifically associated with the enterprise at issue and/or otherwise may not have been built in association with the enterprises. Examples of domains may include a music domain, a local search domain, a smart home domain, etc. Additional details on domains are provided in FIG. 9, below. The application types may also include enterprise-specific applications that the enterprise at issue was involved in building, such as the enterprise type models and the fully customized enterprise-specific models described herein. The ranking component may determine, from the text data and/or from the metadata and utilizing the enterprise type models and/or the fully customized enterprise-specific models, that the voice command at issue is most likely associated with an enterprise-specific application instead of an enterprise-agnostic application and may rank the enterprise-specific application(s) more favorably than the enterprise-agnostic application(s). In examples, these rankings may be associated with confidence levels that may be utilized to determine the ranking and/or to select the application to be utilized. In examples where an enterprise-specific application is selected, natural language processing may be performed utilizing the enterprise-specific application. An orchestrator of the system at issue (which may be a remote system from the voice interface device and/or a speech processing system of the voice interface device itself) may then utilize the selected application for determining how to respond to the user utterance.

In the example where the audio data is received from an enterprise voice interface device, a determination may be made as to whether a customized model has been generated and can be utilized to select and/or rank application(s) for determining how to respond to the voice command. As noted above, instead of developing a fully customized, enterprise-specific model (or while a fully customized model is being developed), the enterprise entity may have provided input data to the system to allow for generation of an enterprise type model to be utilized. A model repository may be queried to determine if the fully customized enterprise-specific model has been generated and validated. If the fully customized enterprise-specific model has been developed and validated, the model repository may return data indicating as much and the fully customized enterprise-specific model may be utilized to rank the applications. In the example where the voice command is "what floor is the pool on," the customized enterprise-specific model may determine an enterprise application that will service the voice command such that audio data is to be output by the voice interface device indicating what floor of the hotel in question has a pool located thereon. It should be understood that anywhere where the phrase "fully customized" and/or "customized" model is utilized herein, those phrases refer to a model that is specific to the enterprise at issue and built in association with the enterprise at issue, unless specifically not described as such.

However, in instances where the model repository does not include a validated customized model for the enterprise entity, the model repository may be queried to determine if an enterprise type model has been generated and validated. As noted above, the amount of time and resources utilized to generate these enterprise type models may be less (sometimes much less) than the fully customized models. As such, in examples, the model repository may have stored therein an enterprise type model associated with the enterprise entity and this enterprise type model may be utilized to select the application to respond to the voice command. In still other examples, an enterprise type model may not have been generated for the enterprise entity at issue, and in these examples the applications may be ranked utilizing default rules and, in examples where the applications are not configured to service the intent at issue, the voice interface device may output audio indicating that the requested information and/or action cannot be performed, such as by outputting "I don't know how to do that." Assuming for illustrative purposes that the enterprise type model was selected and utilized to determine the application that is to respond to the voice command at issue, the enterprise type model may be called for subsequent voice commands if and until the fully customized model is generated and validated. When the fully customized model is generated and validated, that customized model may be utilized instead of the enterprise type model for selecting applications.

In examples, invocation of the applications and/or skills described herein may be performed when the voice command includes an identifier of the application, such as when the voice command is "tell Application A to perform Action B." The phrase "tell Application A" is an indicator of the application to be utilized and this audio data may be utilized to select the application. However, optimally, a voice command of just "perform Action B" would still result in Application A being selected to perform the action at issue. To achieve this, when the ranking component receives the audio data and/or text data and the associated metadata, the audio data and/or text data itself and the metadata may be utilized to determine which voice interface device the audio data came from and may use an identifier of the voice interface device to determine that the device is associated with the enterprise entity. Once the enterprise entity is identified, the enterprise type model and/or the fully customized model may be utilized to determine the application to respond to the voice command even when such a voice command does not include an explicit identifier of the application(s).

Furthermore, different versions of the enterprise type model may be generated and utilized for different device modalities. For example, when the voice command is received from a screenless device, a version of the enterprise type model associated with responses provided by the screenless device may be selected and utilized. In other examples, when the voice command is received from a device having a screen, a different version of the enterprise type model associated with responses provided by a screen may be selected and utilized. It should also be understood that while several examples provided herein are associated with a voice command, the user command may be in the form of a voice command or any other input type, including, for example, a touch input received on a user device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for enterprise type models for voice interfaces. The environment 100 may include, for example, voice interface devices 102(a), 102(b) (also described herein as voice enabled devices) and one or more smart devices (not shown). In certain examples, the smart devices themselves may be any one or more of a voice enabled device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In some examples, the devices may be situated in a home, place of business, healthcare facility (e.g., hospital, doctor's office, pharmacy, etc.), in a vehicle (e.g., airplane, truck, car, bus, etc.), and/or in a public forum (e.g., shopping center, store, hotel, etc.), for example. The devices may be configured to send data to and/or receive data from a system 104, such as via a network 106. It should be understood that where operations are described herein as being performed by the system 104, some or all of those operations may be performed by the devices. It should also be understood that anytime the system 104 is referenced, that system may include any system and/or device, whether local to an environment of the devices or remote from that environment. Additionally, it should be understood that a given space and/or environment may include numerous devices. It should also be understood that when a "space" or "environment" is used herein, those terms mean an area of any size and delineation and can include but are not necessarily limited to a given room, building, or other structure, unless otherwise specifically described as such.

The voice interface devices 102(a), 102(b) may include one or more components, such as, for example, one or more processors 108, one or more network interfaces 110, memory 112, one or more microphones 114, one or more speakers 116, and/or one or more displays 118. The microphones 114 may be configured to capture audio, such as user utterances, and generate corresponding audio data. The speakers 116 may be configured to output audio, such as audio corresponding to audio data received from another device. The displays 118 may be configured to display images corresponding to image data, such as image data received from the system 104. The voice interface devices 102(a), 102(b) may be configured to detect an environmental condition associated with the smart devices and/or the environment associated with the smart devices. Some example sensors that may be utilized to detect conditions may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors, usage data and/or account data may be utilized to determine if an environmental condition is present. In some examples, the sensors may also include radar and/or ultrasonic sensors. The memory 112 may include a model repository 120, which may include one or more models to be utilized for responding to user commands. By way of example, the model repository 120 may include enterprise type models such as Enterprise Type Model A 122, Enterprise Type Model B 124, and/or Custom Model C 126. These models will be described in more detail below by way of example.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the environment 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 128, a user registry 130, an orchestrator 132, one or more applications 134, a model repository 136, and/or a model generator 138. It should be understood that while the components of the system 104 are depicted and/or described as separate from each other in FIG. 1, some or all of the components may be a part of the same system. The speech processing system 128 may include an automatic speech recognition component (ASR) 140 and/or a natural language understanding component (NLU) 142. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 142 and/or as determined from user input via a computing device. Skills may be configured to utilize the intent to output data for input to a text-to-speech component, a link or other resource locator for audio data, and/or a command to a device, such as the smart devices. "Skills" may include applications running on devices, such as the smart devices, and/or may include portions that interface with voice user interfaces of smart devices.

In instances where a voice-enabled device is utilized, skills may extend the functionality of smart devices that can be controlled by users utilizing a voice-user interface. In some examples, skills may be a type of application that may be useable in association with target devices and may have been developed specifically to work in connection with given target devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 130 may be configured to determine and/or generate associations between users, user accounts, environment identifiers, and/or devices. For example, one or more associations between user accounts may be identified, determined, and/or generated by the user registry 130. The user registry 130 may additionally store information indicating one or more applications and/or resources accessible to and/or enabled for a given user account. Additionally, the user registry 130 may include information indicating device identifiers, such as naming identifiers, associated with a given user account, as well as device types associated with the device identifiers. The user registry 130 may also include information indicating user account identifiers, naming indicators of devices associated with user accounts, and/or associations between devices, such as the smart devices. The user registry 130 may also include information associated with usage of the smart devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the environment 100 may be stored or otherwise associated with an account identifier. Data associated with the user accounts may include, for example, account access information, historical usage data, device-association data, and/or preference data. The user registry 130 may also include data indicating enterprise identifiers for the enterprises described herein as well as which device identifiers are associated with the enterprise identifiers and/or which enterprise type models and/or fully customized enterprise-specific models are associated with the enterprise identifiers.

The speech-processing system 128 may be configured to receive audio data from the voice interface devices 102(*a*), 102(*b*) and/or other devices and perform speech-processing operations. For example, the ASR component 140 may be configured to generate text data corresponding to the audio data, and the NLU component 142 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "call the front desk," the NLU component 142 may identify a "call" intent. In this example where the intent data indicates an intent to establish a communication session with "front desk," the speech processing system 128 may call one or more skills and/or applications to effectuate the intent. Skills, as described herein may otherwise be described as applications and may include functionality for utilizing intent data to generate directives and/or instructions.

The components of the environment 100 are described below by way of example. To illustrate, the present innovation may include systems and methods for the generation of enterprise type models that may be utilized sometimes on a temporary basis by enterprises while fully customized models are developed (and/or in place of fully customized models). To do so, the model generator 138 may cause display of a model creation user interface on a user device associated with the enterprise at issue. User input data may be received via the user interface and may be utilized to select one or more options for generation of the enterprise type model. These options may include, for example, an option to select an enterprise type associated with the enterprise. As used herein, a "enterprise type" refers to a predefined type of enterprise that is engaged in generation of the enterprise type models. Example enterprise types may include, for example, a hotel enterprise type, a hospital enterprise type, a long-term care home enterprise type, an office space enterprise type, etc. By differentiating between enterprise types and by receiving user input data indicating which enterprise type is at issue for a given enterprise type model, the corpus of potential voice commands may be limited to those voice commands that are most likely to be uttered for a given enterprise type. For example, a hospital enterprise type may include voice commands such as "call the nurse," "what room am I in," "who is my doctor," etc. Conversely, a hotel enterprise type may include voice commands such as "what time is the pool open," "what floor is the restaurant on," "call the front desk," etc. Generally, at least some voice commands associated with the hospital enterprise type may not typically be uttered in the context of a hotel enterprise type, and vice versa. As such, historical voice command data from customized models that have already been built for other enterprises, and/or other historical voice command data indicating which voice commands are provided for various enterprise types, may be utilized to determine a subset of voice commands that are most likely to be associated with the enterprise type at issue.

The enterprise user may then be presented with indicators of the subset of voice commands that are relevant to the enterprise type at issue and the user may provide user input data indicating selection of one or more of the voice commands in the subset of voice commands that are desired to be associated with the enterprise type model to be generated. Thereafter, the user interface may display functionality for determining what response and/or action should be taken for some or each of the selected voice commands. For example, if the "call the front desk" voice command was selected, the user interface may display an entry field where the enterprise user may input a phone number to be called when such a voice command is received. The enterprise user may go through each or some of the selected voice commands until responses and/or actions are set up. The model generator 138 may then generate the enterprise type model utilizing the enterprise type, the selected voice commands, and the responses and/or actions associated with those voice commands. The enterprise type model may then undergo testing, but that testing may not be as rigorous as when a fully customized model is generated because the voice commands have already been utilized before and the coding utilized to implement such voice commands has, for other enterprises, been previously tested.

In examples, once generated, the enterprise type models may be configured to receive, as input, text data representing a textual version of the voice commands which may be utilized to determine intent data representing a determined intent of the voice commands. Additionally, in examples, the enterprise type models may be configured to receive, as input, the intent data and/or metadata associated with the voice command at issue to determine, as output, an application (e.g., an application created by the associated enterprise) that will service the voice command. The application may output audio responsive to the voice command, output images responsive to the voice command, cause the voice interface device and/or an associated smart device to perform an operation, etc.

Thereafter, the enterprise type models may be stored in the model repository 120, 136 and utilized to select applications 134 to respond to voice commands from voice interface devices associated with the enterprise at issue. It should be understood that in some examples speech processing functionality may be performed by the voice interface devices 102(a), 102(b) themselves and in these examples the model repository 120 may be stored on the voice interface devices 102(a), 102(b). In other examples, at least a portion of the speech processing may be performed by the system 104 and in these examples the model repository 120 may be stored on the system 104. During a runtime scenario, audio representing a user utterance may be captured by a voice interface device 102(a), 102(b). Audio data representing the audio may be generated and may be utilized by the speech processing system 128, and/or by a speech processing application on the voice interface device 102(a), 102(b) to determine a response to the user utterance, which may include an audio response to the user utterance and/or an action to be performed in response to the user utterance by the voice interface device 102(a), 102(b) and/or another device. By way of example, the user utterance may be "what floor is the pool located on." The audio data representing this user utterance may be accompanied by metadata associated with the user utterance, including an identifier of the voice interface device 102(a), 102(b) that captured the audio, an indication of whether the voice interface device has a screen or not, and/or other data associated with the voice command.

Once the audio data and/or the metadata is received, ASR processing may be performed to generate text data representing a textual version of the voice command. At this point, the ranking component 139 may be configured to utilize the models in the model repository 136, including the enterprise type models as described herein, to analyze the text data and determine a ranked list of applications 134 and application types that may be utilized to service the voice command. In examples, the application types may include enterprise-agnostic applications that may be associated with various domains. These enterprise-agnostic applications may not be specifically associated with the enterprise at issue and/or otherwise may not have been built in association with an enterprise. Examples of domains may include a music domain, a local search domain, a smart home domain, etc. Additional details on domains are provided in FIG. 9, below. The application types may also include enterprise-specific applications 134 that the enterprise at issue was involved in building. The enterprise type models and the fully customized enterprise-specific models described herein are used to identify those voice commands that are to be serviced by these enterprise applications 134 including metadata such as confidence levels associated with this identification. The ranking component 139 may determine, from the text data and/or from the metadata and utilizing the enterprise type models and/or the fully customized enterprise-specific models, that the voice command at issue is most likely associated with an enterprise-specific application 134 instead of an enterprise-agnostic application and may rank the enterprise applications 134 more favorably than the enterprise-agnostic applications. In examples, these rankings may be associated with confidence levels that may be utilized to determine the ranking and/or to select the application to be utilized. In examples where an enterprise-specific application 134 is selected, natural language processing may be performed utilizing the enterprise-specific application 134.

The orchestrator 132 may receive output from the NLU component 142 may be query an enterprise-specific application 134 to be utilized for determining an action to be performed in response to the voice command. It should be understood that the orchestrator 132 may be a device operating system (such as the device 102(a), 102(b)), and application, and/or middleware. As shown in FIG. 1, the voice interface device 102(a) may be associated with a first enterprise entity with Enterprise Type A, while the voice interface device 102(b) may be associated with a second enterprise entity with Enterprise Type B. Based at least in part on the voice interface device 102(a), 102(b) being associated with the enterprise entity, the ranking component 139 may determine that one of potentially multiple applications 134, also described herein as skills, associated with the enterprise entity is to be selected for determining how to respond to the user utterance.

In the example where the audio data is received from an enterprise-related voice interface device, a determination may be made as to whether a customized model has been generated and can be utilized to identify the application 134 for determining how to respond to the voice command. As noted above, instead of developing a fully customized model (or while a fully customized model is being developed), the enterprise may have provided input data to the system to allow for generation of an enterprise type model to be utilized for selecting application 134 to handle voice commands. The model repository 120, 136 may be queried to determine if the fully customized model has been generated and validated. If the fully customized model has been developed and validated, the model repository 120, 136 may return data indicating as much and the fully customized model may be utilized by the ranking component 139 to select an application 134 for providing a response to the voice command.

However, in instances where the model repository 120, 136 does not include a validated customized model for the enterprise entity, the model repository 120, 136 may be queried to determine if an enterprise type model has been generated and validated. As noted above, the amount of time and resources utilized to generate these enterprise type models may be less (sometimes much less) than the fully customized models. As such, in examples, the model repository 120, 136 may have stored therein an enterprise type model associated with the enterprise entity and this enterprise type model may be utilized to select an application 134 to respond to the voice command. In still other examples, an enterprise type model may not have been generated for the enterprise entity at issue, and in these examples the ranking component 139 may attempt to rank available applications 134 without the use of an enterprise type model. This may result in a situation where the ranked applications 134 indicate a low confidence level that any of the applications can service the voice command, and in these situations the voice interface device 102(a), 102(b) may output audio indicating that the requested information and/or action cannot be performed, such as by outputting "I don't know how to do that." Assuming for illustrative purposes that the enterprise type model was selected and utilized to route the voice command at issue to the proper enterprise application, the enterprise type model may be called for subsequent voice commands if and until the fully customized model is generated and validated. When the fully customized model is generated and validated, that customized model may be selected instead of the enterprise type model for selecting applications to handle certain voice commands.

In examples, invocation of the applications 134 described herein may be performed when the voice command includes an identifier of the application 134, such as when the voice command is "tell Application A to perform Action B." The phrase "tell Application A" is an indicator of the application 134 to be utilized and this audio data may be utilized to select the application 134. However, optimally, a voice command of just "perform Action B" would still result in Application A being selected to perform the action at issue. To achieve this, when the ranking component 139 receives the audio data and/or the text data and the associated metadata, the audio data and/or the text data itself and the metadata may be utilized to determine which voice interface device 102(a), 102(b) the audio data came from and may use an identifier of the voice interface device 102(a), 102(b) to determine that the device is associated with the enterprise. Once the enterprise is identified, the enterprise type model and/or the fully customized model and their associated application(s) may be selected for responding to voice commands even when those voice commands do not include an explicit identifier of the application(s). Using FIG. 1 as an example, the voice interface device 102(a) may be associated with Enterprise Type Model A 122, while the voice interface device 102(b) may be associated with Enterprise Type Model B 124 and/or with Custom Model 126.

Furthermore, different versions of the enterprise type model may be generated and utilized for different device modalities. For example, when the voice command is received from a screenless device, a version of the enterprise type model associated with responses provided by the screenless device may be selected and utilized. In other examples, when the voice command is received from a device having a screen, a different version of the enterprise type model associated with responses provided by a screen may be selected and utilized. It should also be understood that while several examples provided herein are associated with a voice command, the user command may be in the form of a voice command or any other input type, including, for example, a touch input received on a user device.

As used herein, the one or more models and/or the components responsible for responding to voice commands, including any of the enterprise type models and/or customized models may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with prior voice commands for the enterprise type at issue. The models may be trained for multiple user accounts and/or for a specific user account. As such, the machine learning models may be configured to learn, without human intervention, attributes of collected data and/or actions taken associated with device usage cessation.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices.

As shown in FIG. 1, several of the components of the system 104 and the associated functionality of those components as described herein may be performed by one or more of the devices. Additionally, or alternatively, some or all of the components and/or functionalities associated with the devices may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as computer-readable instructions, data structures, program component, or other data. Such memory 112 and/or the memory described with respect to the components of the system 104 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface(s) described with respect to the components of the system 104 may enable messages between the components and/or devices shown in environment 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s)

described with respect to the components of the system 104 may include a wide area network (WAN) component to enable message over a wide area network.

In some instances, the system 104 may be local to an environment associated the devices. For instance, the system 104 may be located within one or more of the voice interface devices 102(*a*) and/or the smart devices. In some instances, some or all of the functionality of the system 104 may be performed by one or more of the devices. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
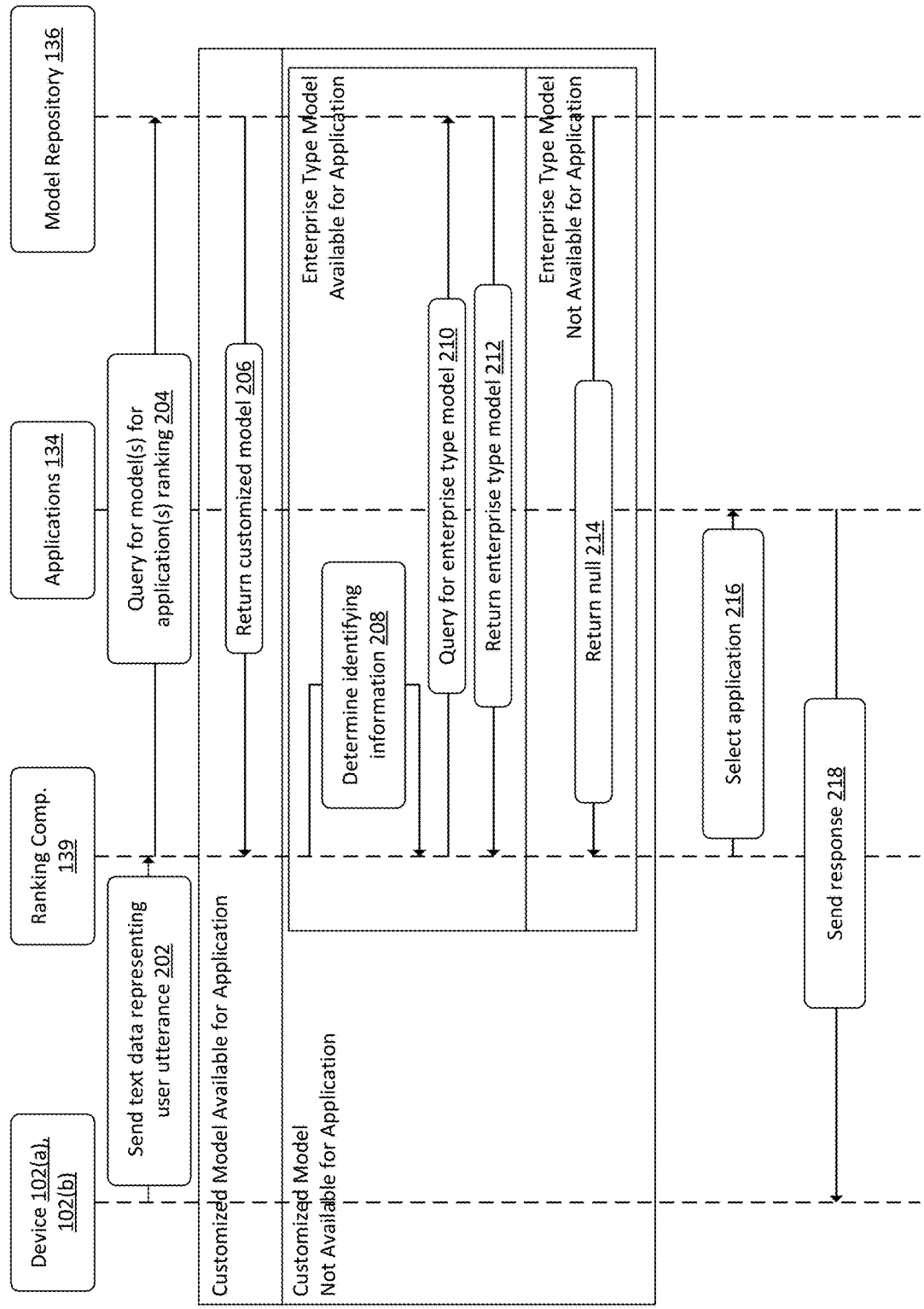
FIG. 2 illustrates a sequence diagram of an example process for determining whether to utilize a customized model and/or an enterprise type model for selecting an application to respond to a voice command.

FIG. 2 illustrates a sequence diagram of an example process for determining whether to utilize a customized model and/or an enterprise type model for selecting an application to respond to a voice command. The operations described with respect to FIG. 2 may be performed in the order shown in FIG. 2 and/or in any other order. Additionally, at least some of the operations may be performed in parallel.

At block 202, one or more voice interface devices 102(*a*), 102(*b*) may send text data representing a user utterance to a ranking component 139 of a system associated with the voice interface devices 102(*a*), 102(*b*). For example, audio representing a user utterance may be captured by a voice interface device 102(*a*), 102(*b*). Audio data representing the audio may be generated and may be utilized by a speech processing system, and/or by a speech processing application on the voice interface device 102(*a*), 102(*b*), to generate text data, such as by ASR processing. By way of example, the user utterance may be "what floor is the pool located on." The audio data representing this user utterance may be accompanied by metadata associated with the user utterance, including an identifier of the voice interface device 102(*a*), 102(*b*) that captured the audio, an indication of whether the voice interface device has a screen or not, and/or other data associated with the voice command.

At block 204, the ranking component 139 may query the model repository 136 to determine if a fully customized enterprise-specific model and/or an enterprise type model is available in the model repository 136 for use in ranking applications 134 for handling the voice command. As described in more detail above, in some examples the enterprise may have developed a fully customized enterprise-specific model that may be utilized to rank applications. However, these fully customized models may be time intensive to generate and/or test. As such, the enterprise may have developed an enterprise type model that may act as a temporary model and/or as an alternative to the fully customized model.

At block 206, the model repository 136 may return one or more results depending on what types of models are stored in the model repository 136. For example, in a first situation where the fully customized model is present in the model repository 136, the customized model may be returned to the ranking component 139 to be utilized for determining a ranking of applications 134 for responding to the voice command.

In another example where the fully customized model is not present in the model repository 136, the ranking component 139 may receive an indication of this from the model repository 136 and may determine identifying information associated with the enterprise at issue at block 208. This identifying information may include some or all of the metadata included herein, including an identifier of the voice interface device 102(*a*), 102(*b*), an identifier of the enterprise, an identifier of the user that provided the voice command, location identifiers associated with the voice interface device 102(*a*), 102(*b*), etc. The ranking component 139 may utilize some or all of this information to determine account data associated with the enterprise such that the account data may be queried to determine if an enterprise type model has been generated and validated for the enterprise at issue.

At block 210, the ranking component 139 may send a query to the model repository 136 for the enterprise type model. When the enterprise type model is present in the model repository 136 (which may indicate that the enterprise type model has been generated and validated), at block 212 the model repository 136 may return the enterprise type model to the ranking component 139 to be utilized for ranking the applications 134.

In still other examples, both the fully customized model and the enterprise type model may not be present in the model repository 136. In these examples, at block 214, the model repository 136 may return data indicating that such models are not available to be utilized. When this occurs, the system may determine one or more other applications 134 to be utilized for responding to the voice command without use of the enterprise type model and/or the fully customized model, if available. If the results of this process indicate that an application 134 is not available and/or that a confidence level associated with the ranking of applications 134 does not satisfy a threshold, the system may determine that a response cannot be provided to the voice command, and in these scenarios an indication that the request cannot be fulfilled may be provided to the user.

When the customized model and/or the enterprise type model is utilized to respond to the voice command, the ranking component 139 may, at block 216, select an application 134 to be utilized to handle the voice command. At this point, the ranking component 139 may be configured to utilize the models in the model repository 136, including the enterprise type models as described herein, to analyze the text data and determine a ranked list of applications 134 and application types that may be utilized to service the voice command. In examples, the application types may include enterprise-agnostic applications that may be associated with various domains. These enterprise-agnostic applications may not be specifically associated with the enterprise at issue and/or otherwise may not have been built in association with an enterprise. Examples of domains may include a music domain, a local search domain, a smart home domain, etc. Additional details on domains are provided in FIG. 9, below. The application types may also include enterprise-specific applications 134 that the enterprise at issue was involved in building. The enterprise type models and the fully customized enterprise-specific models described herein are used to identify those voice commands that are to be serviced by these enterprise applications 134 including metadata such as confidence levels associated with this identification. The ranking component 139 may determine, from the text data and/or from the metadata and utilizing the enterprise type models and/or the fully customized enterprise-specific models, that the voice command at issue is most likely associated with an enterprise-specific application 134 instead of an enterprise-agnostic application and may rank the enterprise applications 134 more favorably than the enterprise-agnostic applications. In examples, these rankings may be associated with confidence levels that may be utilized to determine the ranking and/or to select the application to be utilized. In examples where an enterprise-specific application 134 is selected, natural language processing may be performed utilizing the enterprise-specific application 134.

At block 218, the application 134 may send a response to the voice command to perform an action to the voice interface device 102(a), 102(b) and/or to one or more devices (such as smart devices) associated with the voice interface device 102(a), 102(b).

Figure 3:
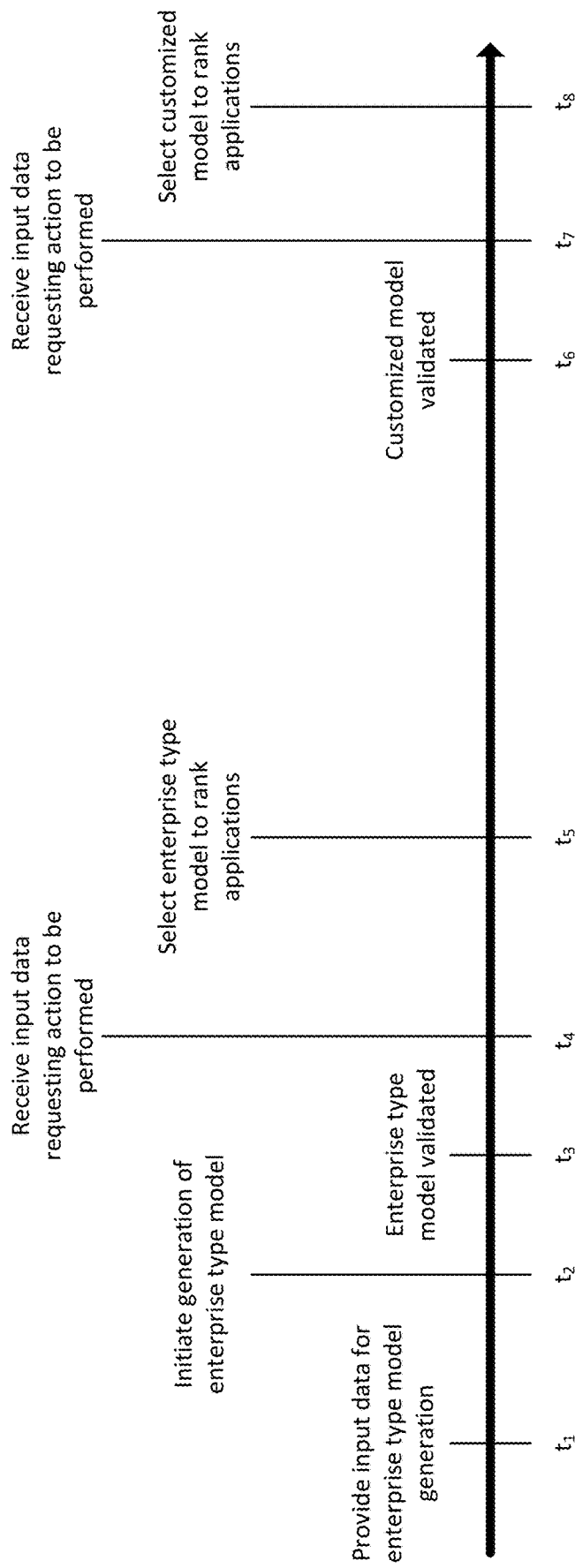
FIG. 3 illustrates a conceptual diagram of a timeline associated with the use of enterprise type models and then later customized models to select applications for responding to user commands.

FIG. 3 illustrates a conceptual diagram of a timeline associated with the use of enterprise type models and then later customized models to select applications for responding to user commands. FIG. 3 illustrates a timeline of potential events with time running from left to right and from time to $t_0$ time $t_8$. It should be understood that while there are eight events shown in FIG. 3, more or less events may occur during a runtime situation where one or more user commands are received. Additionally, FIG. 3 illustrates an example where an enterprise type model is generated first and then later a fully customized model is generated. It should be understood however that situations may occur where the enterprise type model is utilized in place of a fully customized model and such a fully customized model is not later developed and/or utilized.

To illustrate, at time $t_1$, input data may be provided for an enterprise type model to be generated. To do so, a voice interface application creation user interface may be displayed on a user device associated with the enterprise at issue. User input data may be received via the user interface and may be utilized to select one or more options for generation of the enterprise type model. These options may include, for example, an option to select an enterprise type associated with the enterprise. Example enterprise types may include, for example, a hotel enterprise type, a hospital enterprise type, a long-term care home enterprise type, an office space enterprise type, etc. By differentiating between enterprise types and by receiving user input data indicating which enterprise type is at issue for a given enterprise type model, the corpus of potential voice commands may be limited to those voice commands that are most likely to be uttered for a given enterprise type. For example, a hospital enterprise type may include voice commands such as "call the nurse," "what room am I in," "who is my doctor," etc. Conversely, a hotel enterprise type may include voice commands such as "what time is the pool open," "what floor is the restaurant on," "call the front desk," etc. Generally, at least some voice commands associated with the hospital enterprise type may not typically be uttered in the context of a hotel enterprise type, and vice versa. As such, historical voice command data from customized models that have already been built for other enterprises, and/or other historical voice command data indicating which voice commands are provided for various enterprise types, may be utilized to determine a subset of voice commands that are most likely to be associated with the enterprise type at issue.

The enterprise user may then be presented with indicators of the subset of voice commands that are relevant to the enterprise type at issue and the user may provide user input data indicating selection of one or more of the voice commands in the subset of voice commands that are desired to be associated with the enterprise type model to be generated. Thereafter, the user interface may display functionality for determining what response and/or action should be taken for some or each of the selected voice commands. For example, if the "call the front desk" voice command was selected, the user interface may display an entry field where the enterprise user may input a phone number to be called when such a voice command is received. The enterprise user may go through each or some of the selected voice commands until responses and/or actions are set up.

At time $t_2$, the speech processing system associated with the voice interface devices may then initiate generation of the enterprise type model utilizing the enterprise type, the selected voice commands, and the responses and/or actions associated with those voice commands. The enterprise type model generation may include developing and/or otherwise providing a library of intents that an enterprise-specific application is configured to service as well as slots or otherwise indicators of what information may be needed to respond to the intents. For example, for each selected voice command, an intent may be mapped to the voice command as well as what words and/or phrases may be utilized to determine that a given voice command is associated with a given intent. Additionally, for each intent, a payload indicator may be mapped such that different payloads are associated with different actions to be performed. For example, for the voice command "call the front desk," the intent may be to "call" or otherwise establish a communication session with a device. This intent may be mapped to several potential payloads that the application at issue is configured to service. A first payload may be "front desk" indicating a specific device associated with the front desk of a hotel. Another payload may be "room 300," another payload may be "the bell desk," etc. This mapping of intents to payloads and their associated actions to be performed may be generated and may make up the substance of the enterprise type model.

At time $t_3$, the enterprise type model may undergo testing, but that testing may not be as rigorous as when a fully customized model is generated because the voice commands have already been utilized before and the coding utilized to implement such voice commands has, for other enterprises, been previously tested. When the testing is completed and is satisfactory, the enterprise type model may be validated and may be stored in a model repository for use by one or more applications associated with the enterprise at issue.

At time $t_4$, input data may be received requesting an action to be performed. In some examples, the input data may be a voice command from a user of a voice interface device associated with the enterprise. In other examples, the input data may be data representing touch input received at a device associated with the enterprise.

At time $t_5$, the system may determine what type of model should be utilized to rank applications for responding to the input data. As described above, in this example, the enterprise type model has been generated and validated and may be utilized to rank applications. As such, the enterprise type model may be selected and utilized by a ranking component to select an application to respond to the user command. The selected application may then determine what response should be provided in light of the input data and a command and/or directive may be sent to one or more devices associated with the enterprise to cause performance of an action in response to the user input data.

Subsequently, at time $t_6$, a customized model may be generated and validated for the enterprise at issue. As described above, the time $t_6$ may be in some examples months or years after the enterprise type model is generated to allow for generation and testing of the customized model. As such, the enterprise type model may be utilized for selecting an application to respond to several voice commands until (or if) the customized model is generated. Once the customized model is generated, it may be tested and when that testing indicates satisfactory performance the customized model may be validated and stored in the model repository.

At time $t_7$, input data may be received requesting the action to be performed. In this example, the requested action may be the same as the action requested to be performed at time $t_4$. This example is used to illustrate that when a customized model is generated it may be utilized instead of the enterprise type model to select an application for responding to similar voice commands. However, it should be understood that the requested action need not be the same action and instead may be a different action and/or an associated action.

At time $t_8$, the customized model may be selected to respond to the input data received at time $t_7$. In this example, the model repository may include the customized model and the model repository may return the customized model to rank applications to respond to the input data at issue instead of the enterprise type model being utilized. Thereafter, the customized model may be utilized for some or all of the subsequent user requests instead of the enterprise type model being utilized.

Figure 4:
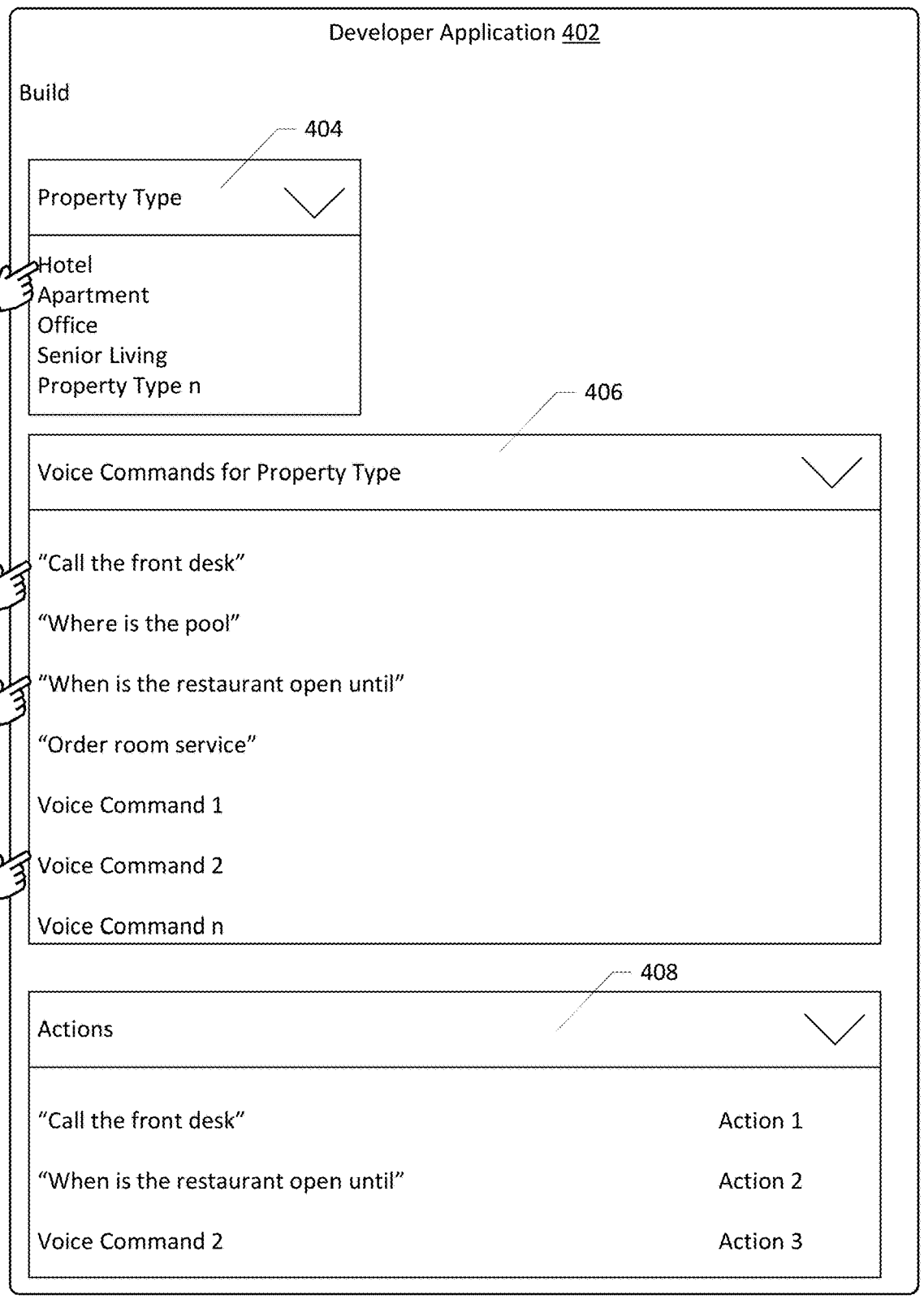
FIG. 4 illustrates an example user interface for the selection and configuration of an enterprise type model to be utilized for selecting applications to respond to user commands.

FIG. 4 illustrates an example user interface for the selection and configuration of an enterprise type model to be utilized for selecting applications to respond to user commands. In the example of FIG. 4, the user interface may be displayed on a user device associated with a given enterprise, and the user of the user device may be developer and/or other enterprise associated with the enterprise and engaged in generating a voice interface application for use by voice interface devices associated with the enterprise.

The user interface may display functionality associated with a developer application 402, which may be provided to the user device to assist in development of an enterprise type model. In examples, the developer application 402 may be in the form of a software development kit (SDK), an application programming interface (API), and/or may be a service that the enterprise user may gain access to for developing the enterprise type model. As such, in examples, little to no coding may be needed from the enterprise user and instead the user interface may present options and fields for input data to be provided, and user selections and input data may be utilized to generate the code representing the enterprise type model.

User input data may be received via the user interface and may be utilized to select one or more options for generation of the enterprise type model. These options may include, for example, a property type option 404, which may be an option to select an enterprise type associated with the enterprise. As used herein, an "enterprise type" refers to a predefined type of enterprise that is engaged in generation of the enterprise type models. Example enterprise types may include, for example, a hotel enterprise type, an apartment enterprise type, a hospital enterprise type, a long-term care home enterprise type, an office space enterprise type, etc. By differentiating between enterprise types and by receiving user input data indicating which enterprise type is at issue for a given enterprise type model, the corpus of potential voice commands may be limited to those voice commands that are most likely to be uttered for a given enterprise type. As shown in FIG. 4, user input data has been received indicating that the property type 404 to be associated with the enterprise at issue is a "hotel."

Once this selection is made, the user interface may display candidate voice commands 406 to be associated with the enterprise type model. For example, a hospital enterprise type may include voice commands such as "call the nurse," "what room am I in," "who is my doctor," etc. Conversely, a hotel enterprise type may include voice commands such as "what time is the pool open," "what floor is the restaurant on," "call the front desk," etc. In the example of FIG. 4 where the property type 404 was the hotel type, the example candidate voice commands 406 are illustrated as "call the front desk," "where is the pool," "when is the restaurant open until," "order room service," and/or one or more other candidate voice commands 406. It should be understood that any number of candidate voice commands 406 may be provided. Generally, at least some voice commands associated with the hospital enterprise type may not typically be uttered in the context of a hotel enterprise type, and vice versa. As such, historical voice command data from customized models that have already been built for other enterprises, and/or other historical voice command data indicating which voice commands are provided for various enterprise types, may be utilized to determine a subset of voice commands that are most likely to be associated with the enterprise type at issue. The enterprise user may then be presented with indicators of the subset of candidate voice commands 406 that are relevant to the enterprise type at issue and the user may provide user input data indicating selection of one or more of the candidate voice commands 406 that are desired to be associated with the enterprise type model to be generated.

The user interface may also display functionality for determining what response and/or action 408 should be taken for some or each of the selected voice commands. For example, if the "call the front desk" voice command was selected, the user interface may display an entry field where the enterprise user may input a phone number to be called when such a voice command is received. The enterprise user may go through each or some of the selected voice commands until responses and/or actions are set up. As shown in FIG. 4, the enterprise user has selected three candidate voice commands 406 to associate with the enterprise type model. Those candidate voice commands 406 are "call the front desk," "when is the restaurant open until," and "Voice Command 2." As such, the actions field 408 may include an indicator of each of these candidate voice commands 406 as well as a field for inputting an action to be performed (with example actions of Action 1, Action 2, and Action 3 illustrated in FIG. 4).

FIGS. 5-8 illustrates processes for enterprise type models for voice interfaces. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, 9, and 10, although the processes may be implemented in a wide variety of other environments, architectures and systems.

Figure 5:
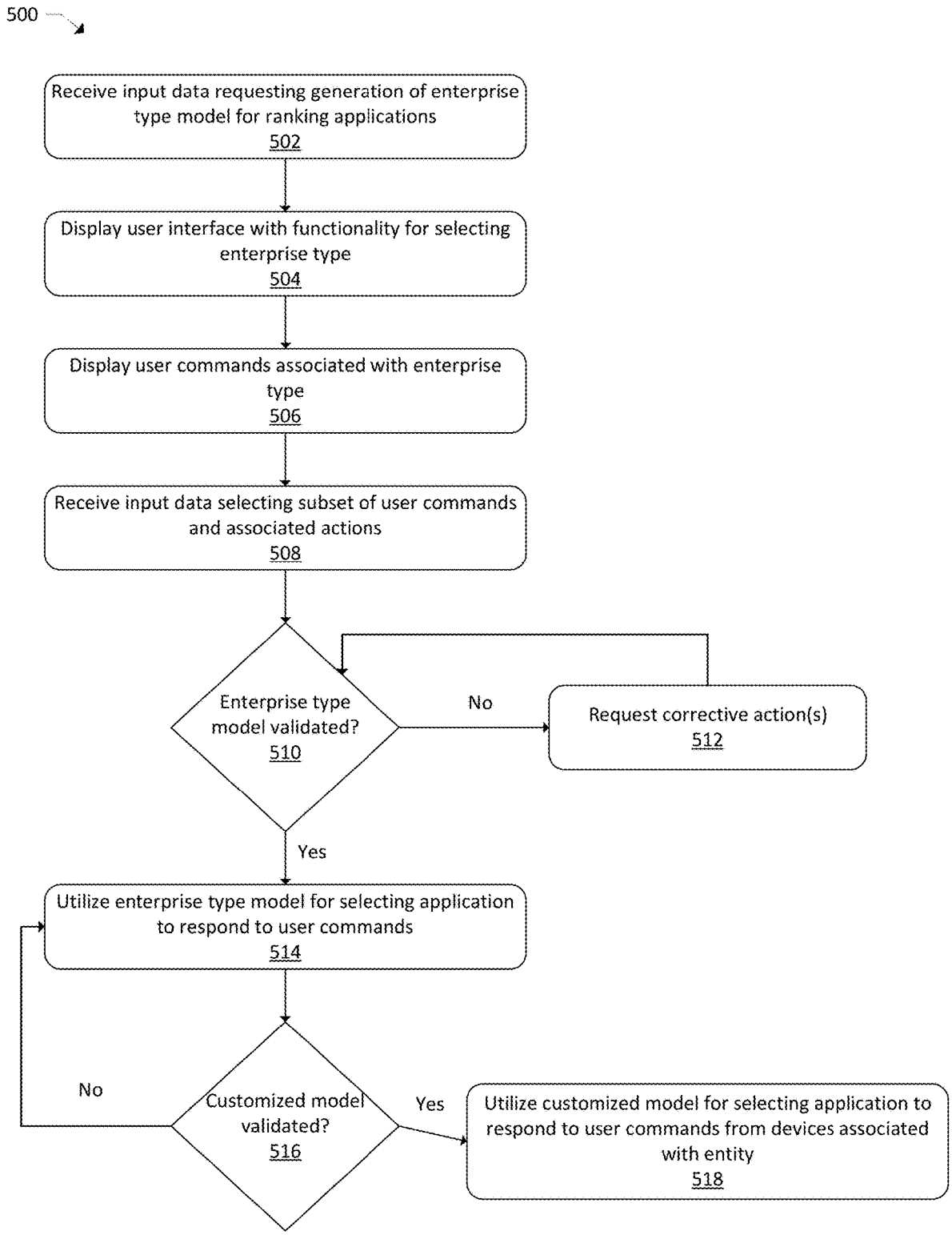
FIG. 5 illustrates a flow diagram of an example process for generation of an enterprise type model and the use of the same.

FIG. 5 illustrates a flow diagram of an example process 500 for generation of an enterprise type model and the use of the same. The order in which the operations or steps are described is not intended to be construed as a limitation, and any number of the described operations may be combined in any order and/or in parallel to implement process 500.

At block 502, the process 500 may include receiving input data requesting generation of an enterprise type model for ranking applications to be utilized for responding to user commands. For example, a developer application interface may be displayed and may allow for a user to provide input to a user device to assist in development of an enterprise type model. In examples, the developer application may be in the form of a SDK, an API, and/or may be a service that the enterprise user may gain access to for developing the enterprise type model. As such, in examples, little to no coding may be needed from the enterprise user and instead the user interface may present options and fields for input data to be provided, and user selections and input data may be utilized to generate the code representing the enterprise type model.

At block 504, the process 500 may include displaying a user interface with functionality for selecting an enterprise type. For example, the user interface may be displayed and may be utilized to select one or more options for generation of an enterprise type model. These options may include, for example, an enterprise type, which may be an option to select an enterprise type associated with the enterprise. As used herein, an "enterprise type" refers to a predefined type of enterprise that is engaged in generation of the enterprise type models. Example enterprise types may include, for example, a hotel enterprise type, an apartment enterprise type, a hospital enterprise type, a long-term care home enterprise type, an office space enterprise type, etc. By differentiating between enterprise types and by receiving user input data indicating which enterprise type is at issue for a given enterprise type model, the corpus of potential user commands may be limited to those user commands that are most likely to be provided for a given enterprise type. It should be understood that user commands may be any commands provided by a user and may take various forms. Voice commands may be a type of user command that specifically includes a user utterance that is captured by a microphone and is converted to audio data for processing.

At block 506, the process 500 may include displaying user commands associated with the enterprise type. For example, once the enterprise type selection is made, the user interface may display candidate user commands to be associated with the enterprise type model. For example, a hospital enterprise type may include user commands such as "call the nurse," "what room am I in," "who is my doctor," etc. Conversely, a hotel enterprise type may include user commands such as "what time is the pool open," "what floor is the restaurant on," "call the front desk," etc. It should be understood that any number of candidate user commands may be provided. Generally, at least some user commands associated with the hospital enterprise type may not typically be provided in the context of a hotel enterprise type, and vice versa. As such, historical voice command data from customized models that have already been built for other enterprises, and/or other historical user command data indicating which user commands are provided for various enterprise types, may be utilized to determine a subset of user commands that are most likely to be associated with the enterprise type at issue. The enterprise user may then be presented with indicators of the subset of candidate user commands that are relevant to the enterprise type at issue and the user may provide user input data indicating selection of one or more of the candidate user commands that are desired to be associated with the enterprise type model to be generated. It should be understood that with respect to at least FIG. 5, the user commands may be voice commands and/or may be commands associated with other types of user input, such as touch in.

At block 508, the process 500 may include receiving input data selecting a subset of user commands and associated actions. For example, the enterprise user may select which of the user commands are to be associated with the enterprise type model and may provide input indicating an action to be performed in response to receiving the user commands. For example, if the "call the front desk" user command was selected, the user interface may display an entry field where the enterprise user may input a phone number to be called when such a user command is received. In examples, the parameters for the action to be performed may be specified on a per-location and/or per-category basis and/or the parameters may otherwise be associated with qualifications for when such actions are to be selected in response to a user command. The enterprise user may go through each or some of the selected user commands until responses and/or actions are set up.

At block 510, the process 500 may include determining whether the enterprise type model has been validated. For example, the enterprise type model may undergo testing, but that testing may not be as rigorous as when a fully customized model is generated because the user commands have already been utilized before and the coding utilized to implement such user commands has, for other enterprises, been previously tested. When the testing is completed and is satisfactory, the enterprise type model may be validated and may be stored in a model repository for use by a ranking component to rank one or more applications associated with the enterprise at issue.

In examples where the enterprise type model has not yet been validated, the process 500 may include, at block 512, requesting one or more corrective actions to be taken by a user associated with the enterprise. The process 500 may return back to 510 where validation may be attempted until successful. In these examples, any errors that may occur while the enterprise type model is tested may be identified and options for correcting the errors may be presented to the enterprise user to assist in correcting any defects in the enterprise type model that may be causing the enterprise type model to not operate satisfactorily when test user commands are provided to it for determining an application to select.

In examples where the enterprise type model has been validated, the process 500 may include, at block 514, utilizing the enterprise type model for selecting an application to respond to user commands from devices associated with the enterprise. For example, the system may determine what type of model should be utilized to determine which application to select for providing a response to the input data. In this example, the enterprise type model has been generated and validated and may be utilized to rank applications. The selected application may be utilized to determine what response should be provided in light of the user commands at issue and a command and/or directive may be sent to one or more devices associated with the enterprise to cause performance of an action in response to the user input data.

At block 516, the process 500 may include determining whether a customized model associated with the enterprise has been validated. For example, at some point that may be several months or years after the enterprise type model is generated, a customized model may be generated and validated for use in association with user commands for the enterprise at issue. As such, the enterprise type model may be utilized for selecting an application until (or if) the customized model is generated. Once the customized model is generated, it may be tested and when that testing indicates satisfactory performance the customized model may be validated and stored in the model repository.

In examples where a customized model has not been validated, the process 500 may return back to block 514 where the enterprise type model may be utilized to respond to user commands if and until a customized model is validated. In this example, the system has determined that the enterprise type model is available for determining a response to a user command but a fully customized model is not yet available. As such, the enterprise type model may be selected for responding to the user command.

In examples where a customized model has been validated, the process 500 may include, at block 518, utilizing the customized model for selecting an application to respond to user commands from device associated with the enterprise. In this example, even though an enterprise type model is available and perhaps has responded to similar user commands previously provided, the presence of the customized model may cause the system to select the customized model to select the application to respond to a given user command.

Figure 6:
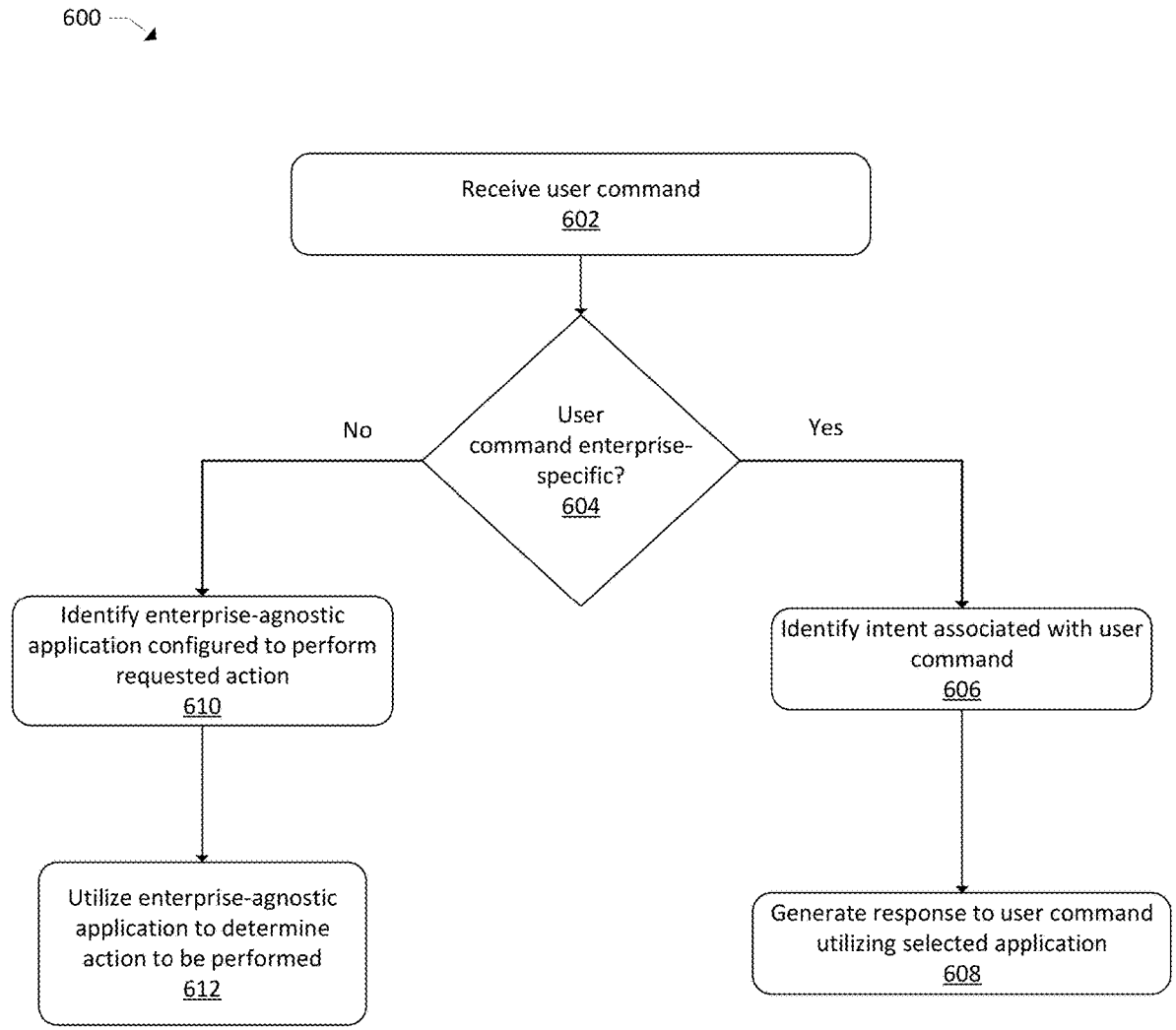
FIG. 6 illustrates a flow diagram of an example process for determining a modality of a user input and selecting an enterprise type model associated with that modality.

FIG. 6 illustrates a flow diagram of an example process 600 for determining a modality of a user input and selecting an enterprise type model associated with that modality. The order in which the operations or steps are described is not intended to be construed as a limitation, and any number of the described operations may be combined in any order and/or in parallel to implement process 600.

At block 602, the process 600 may include receiving a user command. For example, audio representing a user command may be captured by a voice interface device. Audio data representing the audio may be generated and may be utilized by a speech processing system, and/or by a speech processing application on the voice interface device, to determine a response to the user command, which may include an audio response to the user command and/or an action to be performed in response to the user command by the voice interface device and/or another device. By way of example, the user command may be "what floor is the pool located on." The audio data representing this user command may be accompanied by metadata associated with the user command, including an identifier of the voice interface device that captured the audio, an indication of whether the voice interface device has a screen or not, and/or other data associated with the user command. In other examples, the user command may not be a voice command but instead may be a user command received using touch input to a device, which may be a voice interface device in examples.

At block 604, the process 600 may include determining whether the user command is enterprise specific. For example, text data representing the user command and/or metadata that accompanies the user command may be utilized to determine whether the user command is enterprise specific or enterprise agnostic. Once the audio data and/or the metadata is received, ASR processing may be performed to generate text data representing a textual version of the voice command. At this point, a ranking component may be configured to analyze the text data and determine a ranked list of applications and application types that may be utilized to service the voice command. In examples, the application types may include enterprise-agnostic applications that may be associated with various domains. These enterprise-agnostic applications may not be specifically associated with the enterprise at issue and/or otherwise may not have been built in association with the enterprises. Examples of domains may include a music domain, a local search domain, a smart home domain, etc. Additional details on domains are provided in FIG. 9, below. The application types may also include enterprise-specific applications that the enterprise at issue was involved in building, such as the enterprise type models and the fully customized enterprise-specific models described herein. The ranking component may determine, from the text data and/or from the metadata, that the voice command at issue is most likely associated with an enterprise-specific application instead of an enterprise-agnostic application and may rank the enterprise-specific application(s) more favorably than the enterprise-agnostic application(s). In examples, these rankings may be associated with confidence levels that may be utilized to determine the ranking and/or to select the model to be utilized. In examples where an enterprise-specific application is selected, natural language processing may be performed utilizing the enterprise-specific application.

In examples where the user command is enterprise specific, the process 600 may include, at block 606, identifying an intent associated with the user command using the selected application. Natural language understanding may be performed on the audio data and/or the text data to identify the intent, as described in more detail below with respect to FIG. 9.

At block 608, the process 600 may include generating a response to the user command utilizing the selected application. For example, the selected application associated with the enterprise may be called to provide a response to the user command and the application may determine what response should be provided. In examples, the response may include a directive to cause the voice interface device and/or an associated device (such as a smart device) to perform an action in response to the user command and/or the response may include data (such as audio data) to be output on the user device at issue.

Returning to block 604, in examples where the user command is enterprise agnostic, the process 600 may include, at block 610, identifying an enterprise-agnostic application configured to perform a requested action associated with the user command. In this example, the ranking component may have utilized the enterprise type model and/or the customized enterprise-specific model to rank the applications and determine that the user command is likely not associated with an enterprise-specific application. Identifying the application may be performed in the same or a similar manner as how the application is identified as described above.

At block 612, the process 600 may include utilizing the enterprise-agnostic application to determine an action to be performed. This process may be the same or similar to the operations described with respect to block 614, save that the application at issue may be an enterprise-agnostic application that may utilize domains that are not specific to a given enterprise.

FIG. 7 illustrates a flow diagram of an example process 700 for selecting enterprise type models in response to voice commands received in association with an enterprise voice interface device. The order in which the operations or steps are described is not intended to be construed as a limitation, and any number of the described operations may be combined in any order and/or in parallel to implement process 700.

At block 702, the process 700 may include receiving, from a voice interface device, audio data representing a user utterance including a request that an action be performed, the voice interface device associated with account data identifying the voice interface device as being associated with an enterprise. For example, audio representing a user command may be captured by a voice interface device. Audio data representing the audio may be generated and may be utilized by a speech processing system, and/or by a speech processing application on the voice interface device, to determine a response to the user command, which may include an audio response to the user command and/or an action to be performed in response to the user command by the voice interface device and/or another device. By way of example, the user command may be "what floor is the pool located on." The audio data representing this user command may be accompanied by metadata associated with the user command, including an identifier of the voice interface device that captured the audio, an indication of whether the voice interface device has a screen or not, and/or other data associated with the user command. In other examples, the user command may not be a voice command but instead may be a user command received using touch input to a device, which may be a voice interface device in examples.

At block 704, the process 700 may include determining that the account data is associated with an enterprise type model configured to identify a plurality of enterprise applications to service user requests, wherein the enterprise type model is generated based on an enterprise type associated with the enterprise, the enterprise type indicating an industry of the enterprise. Once the audio data and/or the metadata is received, automatic speech recognition (ASR) processing may be performed to generate text data representing a textual version of the voice command. At this point, a ranking component may be configured to analyze the text data and determine a ranked list of applications and application types that may be utilized to service the voice command. In examples, the application types may include enterprise-agnostic applications that may be associated with various domains. These enterprise-agnostic applications may not be specifically associated with the enterprise at issue and/or otherwise may not have been built in association with the enterprises. Examples of domains may include a music domain, a local search domain, a smart home domain, etc. Additional details on domains are provided in FIG. 9, below. The application types may also include enterprise-specific applications that the enterprise at issue was involved in building, such as the enterprise type models and the fully customized enterprise-specific models described herein. The ranking component may query a model repository to determine that the account data is associated with the enterprise type model.

At block 706, the process 700 may include ranking the first enterprise application with other candidate applications to service the request. To do so, the ranking component may retrieve the enterprise type model form the model repository and may apply the enterprise type model to the user utterance to identify an enterprise application from the multiple enterprise applications. The ranking component may determine, from the text data and/or from the metadata and utilizing the enterprise type models and/or the fully customized enterprise-specific models, that the voice command at issue is most likely associated with an enterprise-specific application instead of an enterprise-agnostic application and may rank the enterprise-specific application(s) more favorably than the enterprise-agnostic application(s). In examples, these rankings may be associated with confidence levels that may be utilized to determine the ranking and/or to select the application to be utilized. In examples where an enterprise-specific application is selected, natural language processing may be performed utilizing the enterprise-specific application. An orchestrator of the system at issue (which may be a remote system from the voice interface device and/or a speech processing system of the voice interface device itself) may then utilize the selected application for determining how to respond to the user utterance.

At block 708, the process 700 may include generating, utilizing the enterprise application, a speech processing result associated with the action to be performed. The speech processing result may include a response to be provided to the user device that received the user command and/or an indication of an action to be performed.

At block 710, the process 700 may include sending, to the voice interface device, a directive to cause the action to be performed. For example, an application associated with the enterprise may be called to provide a response to the user command and the application may determine what response should be provided. In this example, the response may include a directive to cause the voice interface device and/or an associated device (such as a smart device) to perform an action in response to the user command.

Additionally, or alternatively, the process 700 may include receiving first data indicating the enterprise type associated with the enterprise. The process 700 may also include determining a subset of intents associated with the enterprise type, wherein the subset of intents represents a portion of potential intents that have been predefined to be associated with the enterprise type. The process 700 may also include generating the enterprise type model such that the subset of intents are identified as being serviceable by the first enterprise application.

Additionally, or alternatively, the process 700 may include receiving, from a device associated with the enterprise, first input data requesting generation of the enterprise type model in association with the voice interface device. The process 700 may also include causing display of a user interface configured to receive second input data indicating the enterprise type of the enterprise. The process 700 may also include receiving the second input data and, in response to the second input data, causing the user interface to display voice command options predefined to be associated with the enterprise type. The process 700 may also include receiving third input data representing selection of one or more of the voice command options. The process 700 may also include generating the enterprise type model utilizing the third input data.

Additionally, or alternatively, the process 700 may include determining that the audio data was received from the voice interface device. The process 700 may also include, in response to the audio data being received from the voice interface device, selecting the enterprise type model to be utilized to be utilized to identify the first enterprise type model.

Figure 8:
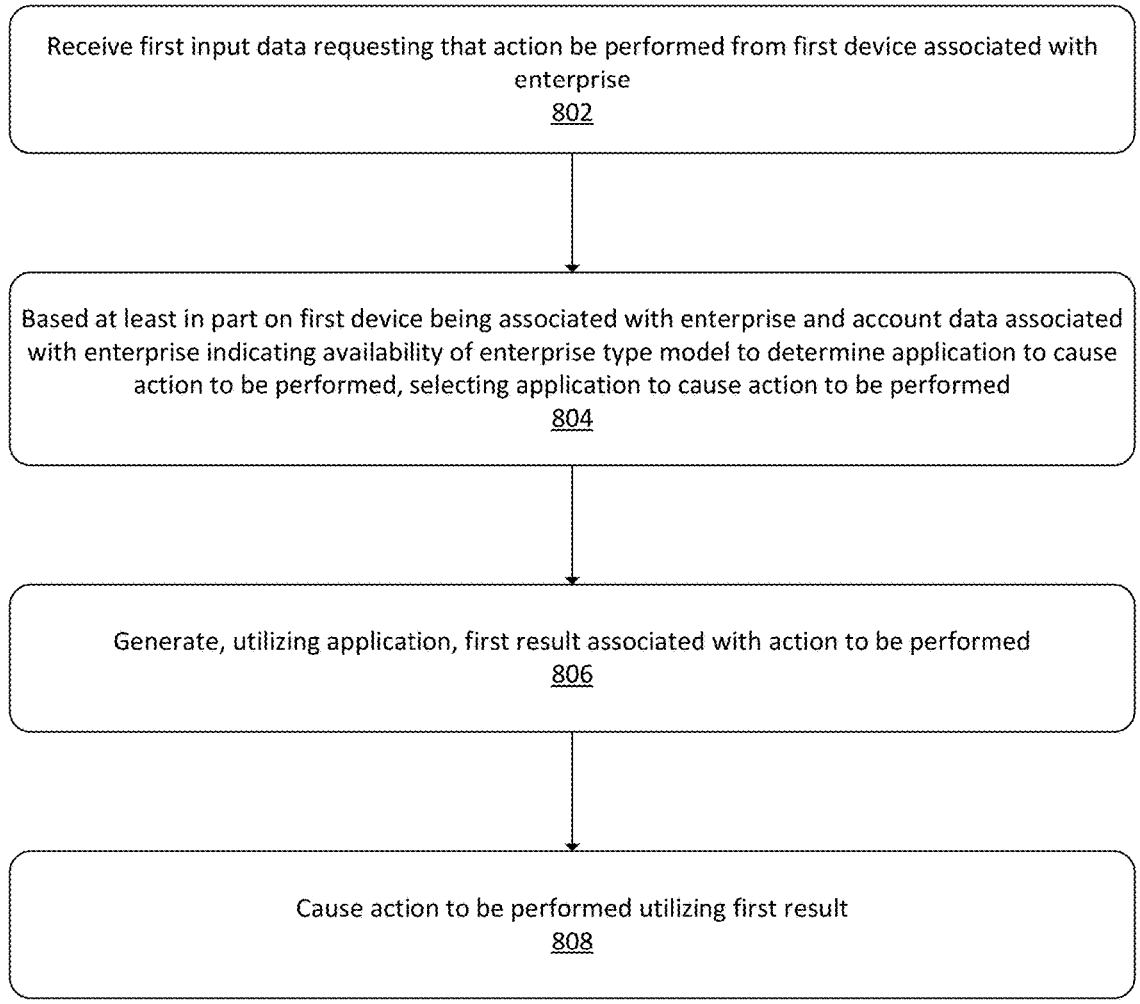
FIG. 8 illustrates a flow diagram of another example process for selecting enterprise type models in response to user commands received in association with an enterprise voice interface device.

FIG. 8 illustrates a flow diagram of another example process 800 for selecting enterprise type models in response to user commands received in association with an enterprise voice interface device. The order in which the operations or steps are described is not intended to be construed as a limitation, and any number of the described operations may be combined in any order and/or in parallel to implement process 800.

At block 802, the process 800 may include receiving first input data requesting that an action be performed from a first device associated with an enterprise. For example, audio representing a user command may be captured by a voice interface device. Audio data representing the audio may be generated and may be utilized by a speech processing system, and/or by a speech processing application on the voice interface device, to determine a response to the user command, which may include an audio response to the user command and/or an action to be performed in response to the user command by the voice interface device and/or another device. By way of example, the user command may be "what floor is the pool located on." The audio data representing this user command may be accompanied by metadata associated with the user command, including an identifier of the voice interface device that captured the audio, an indication of whether the voice interface device has a screen or not, and/or other data associated with the user command. In other examples, the user command may not be a voice command but instead may be a user command received using touch input to a device, which may be a voice interface device in examples.

At block 804, the process 800 may include, based at least in part on the first device being associated with the enterprise and account data associated with the enterprise indicating availability of an enterprise type model to determine an application to cause the action to be performed, selecting the application to cause the action to be performed. Once the audio data and/or the metadata is received, automatic speech recognition (ASR) processing may be performed to generate text data representing a textual version of the voice command. At this point, a ranking component may be configured to analyze the text data and determine a ranked list of applications and application types that may be utilized to service the voice command. In examples, the application types may include enterprise-agnostic applications that may be associated with various domains. These enterprise-agnostic applications may not be specifically associated with the enterprise at issue and/or otherwise may not have been built in association with the enterprises. Examples of domains may include a music domain, a local search domain, a smart home domain, etc. Additional details on domains are provided in FIG. 9, below. The application types may also include enterprise-specific applications that the enterprise at issue was involved in building, such as the enterprise type models and the fully customized enterprise-specific models described herein. The ranking component may query a model repository to determine that the account data is associated with the enterprise type model.

The ranking component may determine, from the text data and/or from the metadata and utilizing the enterprise type models and/or the fully customized enterprise-specific models, that the voice command at issue is most likely associated with an enterprise-specific application instead of an enterprise-agnostic application and may rank the enterprise-specific application(s) more favorably than the enterprise-agnostic application(s). In examples, these rankings may be associated with confidence levels that may be utilized to determine the ranking and/or to select the application to be utilized. In examples where an enterprise-specific application is selected, natural language processing may be performed utilizing the enterprise-specific application. An orchestrator of the system at issue (which may be a remote system from the voice interface device and/or a speech processing system of the voice interface device itself) may then utilize the selected application for determining how to respond to the user utterance.

At block 806, the process 800 may include generating, utilizing the application, a first result associated with the action to be performed. The speech processing result may include a response to be provided to the user device that received the user command and/or an indication of an action to be performed.

At block 808, the process 800 may include causing the action to be performed utilizing the first result. For example, an application associated with the enterprise may be called to provide a response to the user command and the application may utilize the enterprise type model to determine what response should be provided. In this example, the response may include a directive to cause the voice interface device and/or an associated device (such as a smart device) to perform an action in response to the user command. In other examples, causing the device in question to perform the action may not be based on a directive but may be based instead on other types of instructions provided to the device at issue.

Additionally, or alternatively, the process 800 may include receiving first data indicating an enterprise type associated with the predefined enterprise. The process 800 may also include determining a subset of inputs to associate with the enterprise type model based at least in part on the enterprise type. The process 800 may also include generating the enterprise type model such that the subset of inputs are identified as being associated with the application.

Additionally, or alternatively, the process 800 may include receiving, from a second device associated with the predefined enterprise, second input data requesting generation of the enterprise type model in association with the first device. The process 800 may also include causing display of a user interface configured to receive third input data indicating the enterprise type of the predefined enterprise. The process 800 may also include receiving the third input data and, based at least in part on the third input data, causing the user interface to display user command response options predefined to be associated with the enterprise type. The process 800 may also include receiving fourth input data representing selection of one or more of the user command response options and generating the enterprise type model utilizing the fourth input data.

Additionally, or alternatively, the process 800 may include determining that the first input data was received from the first device. The process 800 may also include, based at least in part on the first input data being received from the first device, determining that the enterprise type model is available in a model repository for selecting the application.

Additionally, or alternatively, the process 800 may include determining text data based at least in part on the first input data. The process 800 may also include determining, utilizing the enterprise type model, that the text data is associated with an enterprise-specific request instead of an enterprise-agnostic request, wherein selecting the application is based at least in part on the text data being associated with the enterprise-specific request.

Additionally, or alternatively, the process 800 may include receiving second input data requesting that the action be performed. The process 800 may also include determining that the second input data includes an enterprise-agnostic request. The process 800 may also include, based at least in part on the second input data including an enterprise-agnostic request and utilizing the enterprise type model, determining to select an enterprise-agnostic domain to service the enterprise-agnostic request.

Additionally, or alternatively, the process 800 may include generating a first version of the enterprise type model configured to be utilized for selecting candidate applications for responding to voice commands received at a microphone of the first device. The process 800 may also include generating a second version of the enterprise type model configured to be utilized for selecting the candidate applications for responding to touch input received at a screen of the first device. The process 800 may also include determining that the first input data is a voice command instead of the touch input. The process 800 may also include selecting the first version of the enterprise type model based at least in part on the first input data being the voice command.

Additionally, or alternatively, the process 800 may include determining a subset of prior use data associated with an enterprise type of the predefined enterprise. The process 800 may also include generating training data from the subset of the prior use data. The process 800 may also include training the enterprise type model utilizing the training data.

Figure 9:
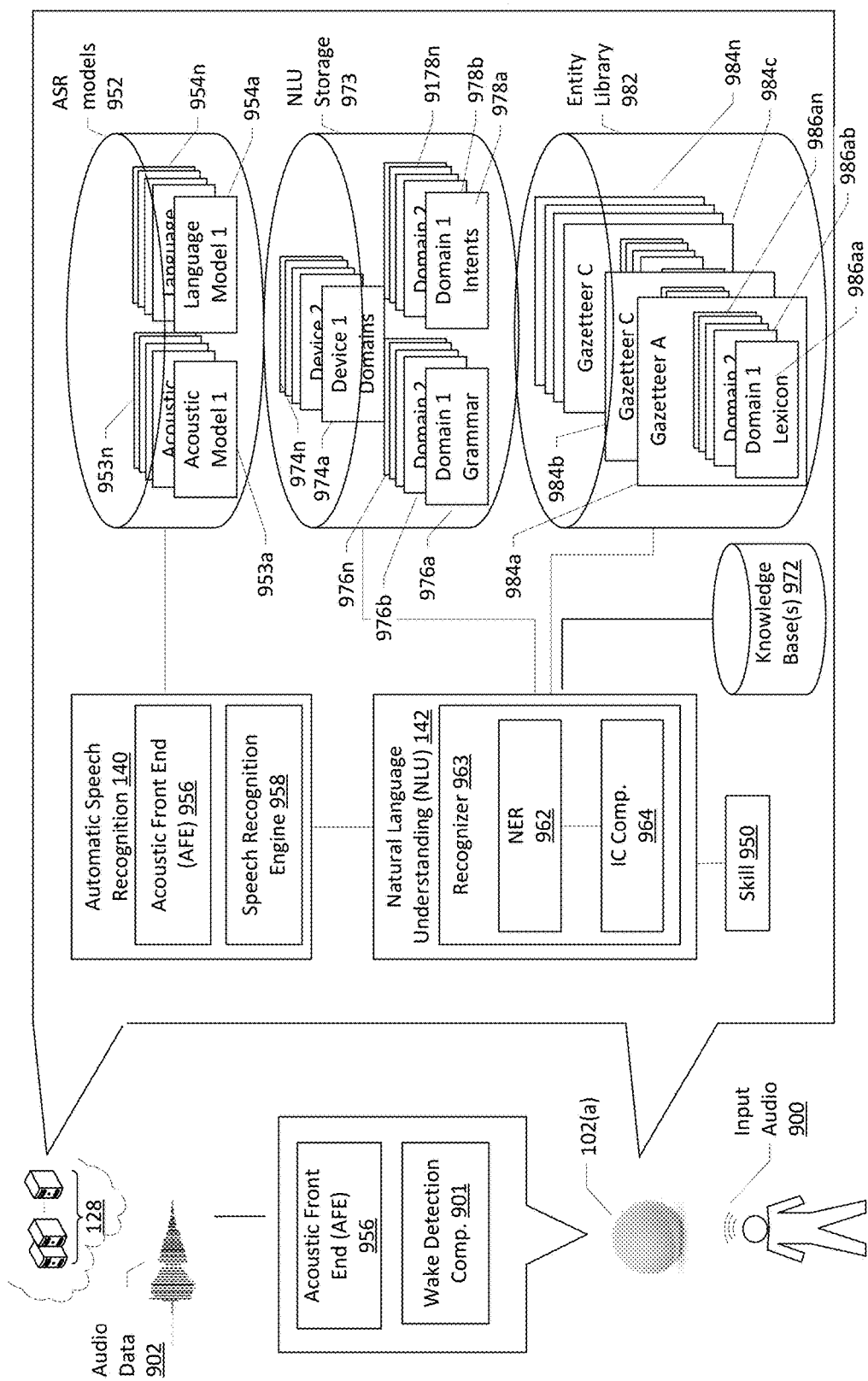
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 9 may occur directly or across a network 106. An audio capture component, such as a microphone 114 of the device 102, or another device, captures audio 900 corresponding to a spoken utterance. The device 102, using a wake word engine 901, then processes audio data corresponding to the audio 900 to determine if a keyword (such as a wakeword) is detected in the audio data. Following detection of a wakeword, the device 102(*a*) processes audio data 902 corresponding to the utterance utilizing an ASR component 140. The audio data 902 may be output from an optional acoustic front end (AFE) 956 located on the device prior to transmission. In other instances, the audio data 902 may be in a different form for processing by a remote AFE 956, such as the AFE 956 located with the ASR component 140.

The wake word engine 901 works in conjunction with other components of the user device, for example a microphone to detect keywords in audio 900. For example, the device may convert audio 900 into audio data, and process the audio data with the wake word engine 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102(*a*) may "wake." The audio data 902 may include data corresponding to the wakeword. Further, a local device may "wake" upon detection of speech/spoken audio above a threshold, as described herein. An ASR component 140 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 140 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956).

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what time is the pool open until" The wake detection component may identify the wake word, otherwise described as a trigger expression, "Alexa," in the user utterance and may "wake" based on identifying the wake word. The speech recognition engine 958 may identify, determine, and/or generate text data corresponding to the user utterance, here "what time is the pool open until."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 142 may include various components, including potentially dedicated processor(s), memory, storage, etc. As shown in FIG. 9, an NLU component 142 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 140 based on the utterance input audio 900) and attempts to make a semantic interpretation of the text. That is, the NLU process determines the meaning behind the text based on the individual words and then implements that meaning. NLU processing 142 interprets a text string to derive an intent or a desired action from the user as well as the pertinent pieces of information in the text that allow a device (e.g., device 102) to complete that action. For example, if a spoken utterance is processed using ASR 140 and outputs the text "what time is the pool open until" the NLU process may determine that the user intended to receive a response to the voice command indicating a time when the pool of the enterprise entity closes.

The NLU 142 may process several textual inputs related to the same utterance. For example, if the ASR 140 outputs N text segments (as part of an N-best list), the NLU may process all N outputs to obtain NLU results.

As will be discussed further below, the NLU process may be configured to parse and tag to annotate text as part of NLU processing. For example, for the text "what time is the pool open until," "what time" may be tagged as a command (to determine a time to respond to the user with).

To correctly perform NLU processing of speech input, an NLU process 142 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 142 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (976) framework or frameworks may correspond to sentence structures such as "purchase item called 'Item A' from Marketplace A."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 950. The destination speechlet 950 may be determined based on the NLU output. For example, if the NLU output includes a command to send a message, the destination speechlet 950 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 950 may provide some or all of this information to a text-to-speech (TTS) engine. The TTS engine may then generate an actual audio file for outputting the audio data determined by the application (e.g., "okay," or "the pool closes at 10:00 pm").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 142 during runtime operations where NLU operations are performed on text (such as text output from an ASR component 140). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, device 102(a) may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 128, as illustrated herein are exemplary, and may be located in a stand-alone device or may be included, in whole or in part, as a component of a larger device or system, may be distributed across a network or multiple devices connected by a network, etc.

Figure 10:
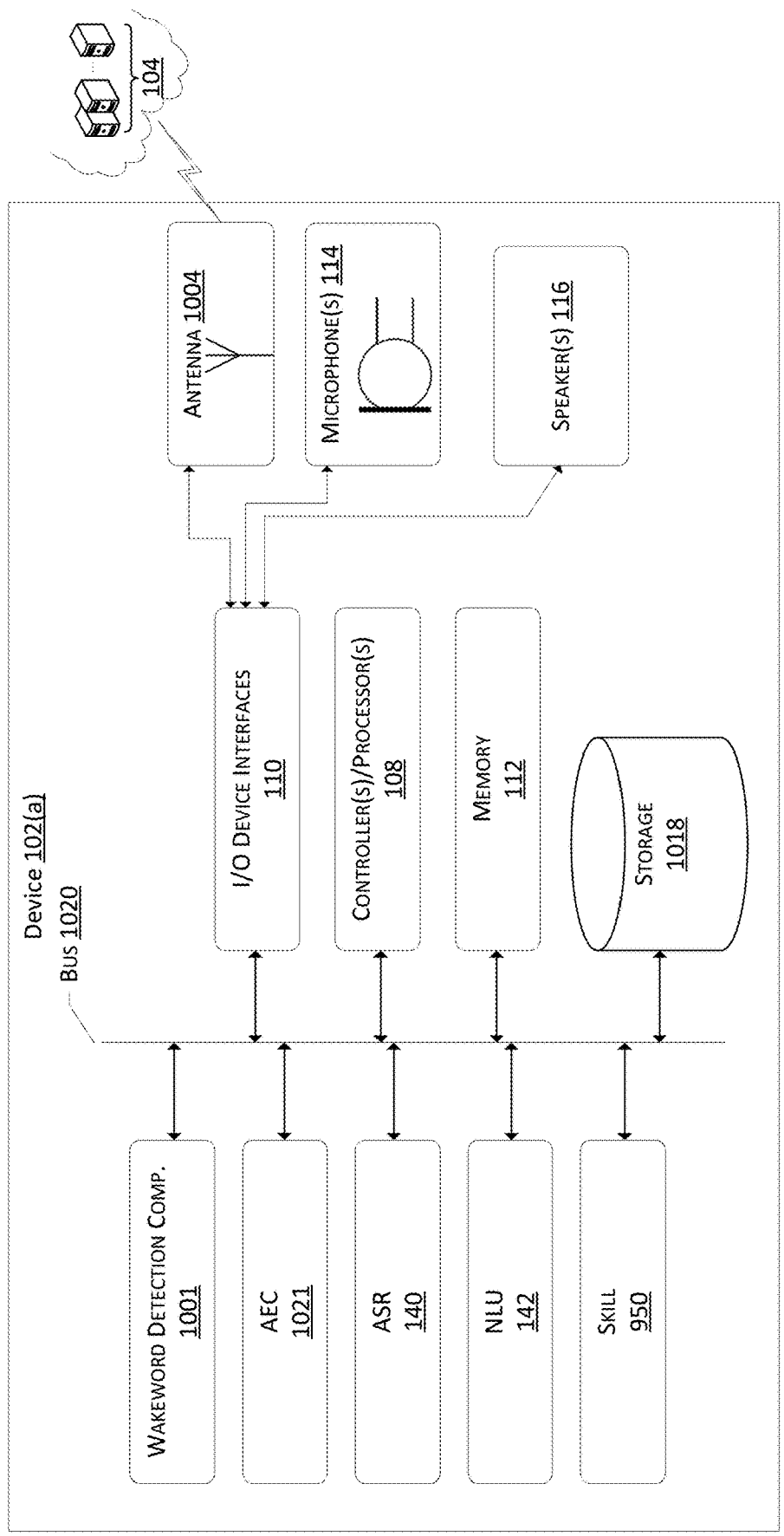
FIG. 10 illustrates a conceptual diagram of components of an example device that may utilized in association with enterprise type models for voice interfaces.

FIG. 10 illustrates a conceptual diagram of components of an example connected device from which sensor data may be received for device functionality control utilizing activity prediction. For example, the device may include one or more electronic devices such as voice interface devices (e.g., smart speaker devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102(a) may be implemented as a standalone device that is relatively simple in terms of functional capabilities with limited input/output components, memory, and processing capabilities. For instance, the device 102(a) may not have a keyboard, keypad, touchscreen, or other form of mechanical input. In some instances, the device 102(a) may include a microphone 114, a power source, and functionality for sending generated audio data via one or more antennas 1004 to another device and/or system.

The device 102(a) may also be implemented as a more sophisticated computing device, such as a computing device similar to, or the same as, a smart phone or personal digital assistant. The device 102(a) may include a display with a touch interface and various buttons for providing input as well as additional functionality such as the ability to send and receive communications. Alternative implementations of the device 102(a) may also include configurations as a personal computer. The personal computer may include input devices such as a keyboard, a mouse, a touchscreen, and other hardware or functionality that is found on a desktop, notebook, netbook, or other personal computing devices. In examples, the device 102(a) may include an automobile, such as a car. In other examples, the device 102(a) may include a pin on a user's clothes or a phone on a user's person. In examples, the device 102(a) and may not include speaker(s) and may utilize speaker(s) of an external or peripheral device to output audio via the speaker(s) of the external/peripheral device. In this example, the device 102(a) might represent a set-top box (STB), and the device 102(a) may utilize speaker(s) of another device such as a television that is connected to the STB for output of audio via the external speakers. In other examples, the device 102(a) may not include the microphone(s) 114, and instead, the device 102(a) can utilize microphone(s) of an external or peripheral device to capture audio and/or generate audio data. In this example, the device 102(a) may utilize microphone(s) of a headset that is coupled (wired or wirelessly) to the device 102(a). These types of devices are provided by way of example and are not intended to be limiting, as the techniques described in this disclosure may be used in essentially any device that has an ability to recognize speech input or other types of natural language input.

The device 102(a) of FIG. 10 may include one or more controllers/processors 108, that may include a central processing unit (CPU) for processing data and computer-readable instructions, and memory 112 for storing data and instructions of the device 102. In examples, the skills and/or applications described herein may be stored in association with the memory 112, which may be queried for content and/or responses as described herein. The device 102(a) may also be connected to removable or external non-volatile memory and/or storage, such as a removable memory card, memory key drive, networked storage, etc., through input/output device interfaces 110.

Computer instructions for operating the device 102(a) and its various components may be executed by the device's controller(s)/processor(s) 108, using the memory 112 as "working" storage at runtime. A device's computer instructions may be stored in a non-transitory manner in non-volatile memory 112, storage 1018, or an external device(s). Alternatively, some or all of the executable instructions may be embedded in hardware or firmware on the device 102(a) in addition to or instead of software.

The device 102(a) may include input/output device interfaces 110. A variety of components may be connected through the input/output device interfaces 110. Additionally, the device 102(a) may include an address/data bus 1020 for conveying data among components of the respective device. Each component within a device 102(a) may also be directly connected to other components in addition to, or instead of, being connected to other components across the bus 1020.

The device 102(a) may include a display, which may comprise a touch interface. Any suitable display technology, such as liquid crystal display (LCD), organic light emitting diode (OLED), electrophoretic, and so on, may be utilized for the displays. Furthermore, the processor(s) 108 may comprise graphics processors for driving animation and video output on the associated display. As a way of indicating to a user that a connection between another device has been opened, the device 102(a) may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 110 that connect to a variety of components. This wired or a wireless audio and/or video port may allow for input/output of audio/video to/from the device 102. The device 102(a) may also include an audio capture component. The audio capture component may be, for example, a microphone 114 or array of microphones, a wired headset or a wireless headset, etc. The microphone 114 may be configured to capture audio. If an array of microphones is included, approximate distance to a sound's point of origin may be determined using acoustic localization based on time and amplitude differences between sounds captured by different microphones of the array. The device 102(a) (using microphone 114, wakeword detection component 1001, ASR component 140, etc.) may be configured to generate audio data corresponding to captured audio. The device 102(a) (using input/output device interfaces 110, antenna 1004, etc.) may also be configured to transmit the audio data to the remote system 104 for further processing or to process the data using internal components such as a wakeword detection component 1001.

Via the antenna(s) 1004, the input/output device interface 110 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102(a) via wired connection to an external alternating current (AC) outlet, and/or via onboard power sources, such as batteries, solar panels, etc.

Through the network(s), the system may be distributed across a networked environment. Accordingly, the device 102(a) and/or the system 104 may include an ASR component 140. The ASR component 140 of device 102(a) may be of limited or extended capabilities. The ASR component 140 may include language models stored in ASR model storage component, and an ASR component 140 that performs automatic speech recognition. If limited speech recognition is included, the ASR component 140 may be configured to identify a limited number of words, such as keywords detected by the device, whereas extended speech recognition may be configured to recognize a much larger range of words.

The device 102(a) and/or the system 104 may include a limited or extended NLU component 142. The NLU component 142 of device 102(a) may be of limited or extended capabilities. The NLU component 142 may comprise a name entity recognition module, an intent classification module and/or other components. The NLU component 142 may also include a stored knowledge base and/or entity library, or those storages may be separately located.

In examples, AEC may also be performed by the device 102. In these examples, the operations may include causing the AEC component 1021 to be enabled or otherwise turned on, or the operations may include causing the AEC component 1021 to transition from a first mode to a second mode representing a higher sensitivity to audio data generated by the microphone 114. The AEC component 1021 may utilize the audio data generated by the microphone 114 to determine if an audio fingerprint of the audio data, or portion thereof, corresponds to a reference audio fingerprint associated with the predefined event.

The device 102(a) and/or the system 104 may also include a speechlet 950 that is configured to execute commands/functions associated with a spoken command as described herein. The device 102(a) may include a wakeword detection component 901, which may be a separate component or may be included in an ASR component 140. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102(a) may be configured collectively to identify a set of the directional audio signals in which the wake expression is detected or in which the wake expression is likely to have occurred.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving, from a device associated with an enterprise, first input data indicating an enterprise type of the enterprise, the enterprise type indicating an industry of the enterprise;
receiving, from a voice interface device, audio data representing a user utterance including a request that an action be performed, the voice interface device associated with account data identifying the voice interface device as being associated with the enterprise;
determining that the account data is associated with an enterprise type model configured to identify a plurality of enterprise applications to service user requests, wherein the enterprise type model is generated based on the enterprise type of the enterprise;
retrieving the enterprise type model from a model repository;
applying the enterprise type model to the user utterance to identify a first enterprise application from the plurality of enterprise applications;
ranking the first enterprise application with other candidate applications to service the request;
selecting the first enterprise application to service the request;
generating, utilizing the first enterprise application, a speech processing result associated with the action to be performed; and
sending, to the voice interface device, a directive to cause the action to be performed.

2. The system of claim 1, the operations further comprising:
determining a subset of intents associated with the enterprise type, wherein the subset of intents represents a portion of potential intents that have been predefined to be associated with the enterprise type; and
generating the enterprise type model such that the subset of intents is identified as being serviceable by the first enterprise application.

3. The system of claim 1, the operations further comprising:
receiving, from the device associated with the enterprise, second input data requesting generation of the enterprise type model in association with the voice interface device;
causing display of a user interface configured to receive the first input data indicating the enterprise type of the enterprise;
receiving the first input data;
in response to the first input data, causing the user interface to display voice command options predefined to be associated with the enterprise type;
receiving third input data representing selection of one or more of the voice command options; and
generating the enterprise type model utilizing the third input data.

4. The system of claim 1, the operations further comprising:
determining that the audio data was received from the voice interface device; and
in response to the audio data being received from the voice interface device, selecting the enterprise type model to be utilized to identify the first enterprise application.

5. A method, comprising:
receiving, from a first device associated with an enterprise, first input data indicating an enterprise type of the enterprise, the enterprise type indicating an industry of the enterprise;
receiving, from a second device associated with the enterprise, second input data requesting that an action be performed;
based at least in part on the second device being associated with the enterprise and account data associated with the enterprise indicating availability of an enterprise type model to determine an application to cause the action to be performed, selecting the application to cause the action to be performed;
generating, utilizing the application, a first result associated with the action to be performed; and
causing the action to be performed utilizing the first result.

6. The method of claim 5, further comprising:
determining a subset of inputs to associate with the enterprise type model based at least in part on the enterprise type; and
generating the enterprise type model such that the subset of inputs is identified as being associated with the application.

7. The method of claim 5, further comprising:
receiving, from the first device associated with the enterprise, third input data requesting generation of the enterprise type model in association with the second device;
causing display of a user interface configured to receive the first input data indicating the enterprise type of the enterprise;
receiving the first input data;
based at least in part on the first input data, causing the user interface to display user command response options predefined to be associated with the enterprise type;
receiving fourth input data representing selection of one or more of the user command response options; and
generating the enterprise type model utilizing the fourth input data.

8. The method of claim 5, further comprising:
determining that the second input data was received from the second device; and based at least in part on the second input data being received from the second device, determining that the enterprise type model is available in a model repository for selecting the application.

9. The method of claim 5, further comprising:
determining text data based at least in part on the second input data; and
determining, utilizing the enterprise type model, that the text data is associated with an enterprise-specific request instead of an enterprise-agnostic request, wherein selecting the application is based at least in part on the text data being associated with the enterprise-specific request.

10. The method of claim 5, further comprising:
receiving third input data requesting that another action be performed;
determining that the third input data includes an enterprise-agnostic request; and
based at least in part on the third input data including an enterprise-agnostic request and utilizing the enterprise type model, determining to select an enterprise-agnostic domain to service the enterprise-agnostic request.

11. The method of claim 5, further comprising:
generating a first version of the enterprise type model configured to be utilized for selecting candidate applications for responding to voice commands received at a microphone of the second device;
generating a second version of the enterprise type model configured to be utilized for selecting the candidate applications for responding to touch input received at a screen of the second device;
determining that the second input data is a voice command instead of the touch input; and
utilizing the first version of the enterprise type model based at least in part on the second input data being the voice command.

12. The method of claim 5, further comprising:
determining a subset of prior use data associated with the enterprise type of the enterprise;
generating training data from the subset of the prior use data; and
training the enterprise type model utilizing the training data.

13. A system, comprising:
one or more processors; and
non-transitory computer-readable media storing computer-executable instructions that, when executed by the one or more processors, cause the one or more processors to perform operations comprising:
receiving, from a first device associated with an enterprise, first input data indicating an enterprise type of the enterprise, the enterprise type indicating an industry of the enterprise;
receiving, from a second device associated with the enterprise, second input data requesting that an action be performed;
based at least in part on the second device being associated with the enterprise and account data associated with the enterprise indicating availability of an enterprise type model to determine an application to cause the action to be performed, selecting the application to cause the action to be performed;
generating, utilizing the application, a first result associated with the action to be performed; and
causing the action to be performed utilizing the first result.

14. The system of claim 13, the operations further comprising:
determining a subset of inputs to associate with the enterprise type model based at least in part on the enterprise type; and
generating the enterprise type model such that the subset of inputs is identified as being associated with the application.

15. The system of claim 13, the operations further comprising:
receiving, from the first device associated with the enterprise, third input data requesting generation of the enterprise type model in association with the second device;
causing display of a user interface configured to receive the first input data indicating the enterprise type of the enterprise;
receiving the first input data;
based at least in part on the first input data, causing the user interface to display user command response options predefined to be associated with the enterprise type;
receiving fourth input data representing selection of one or more of the user command response options; and
generating the enterprise type model utilizing the fourth input data.

16. The system of claim 13, the operations further comprising:
determining that the second input data was received from the second device; and
based at least in part on the second input data being received from the second device, determining that the enterprise type model is available in a model repository for selecting the application.

17. The system of claim 13, the operations further comprising:
determining text data based at least in part on the second input data; and
determining, utilizing the enterprise type model, that the text data is associated with an enterprise-specific request instead of an enterprise-agnostic request, wherein selecting the application is based at least in part on the text data being associated with the enterprise-specific request.

18. The system of claim 13, the operations further comprising:
receiving third input data requesting that another action be performed;
determining that the third input data includes an enterprise-agnostic request; and
based at least in part on the third input data including an enterprise-agnostic request and utilizing the enterprise type model, determining to select an enterprise-agnostic domain to service the enterprise-agnostic request.

19. The system of claim 13, the operations further comprising:
generating a first version of the enterprise type model configured to be utilized for selecting candidate applications for responding to voice commands received at a microphone of the second device;
generating a second version of the enterprise type model configured to be utilized for selecting the candidate applications for responding to touch input received at a screen of the second device;
determining that the second input data is a voice command instead of the touch input; and utilizing the first version of the enterprise type model based at least in part on the second input data being the voice command.

20. The system of claim 13, the operations further comprising:
  determining a subset of prior use data associated with the enterprise type of the enterprise;
  generating training data from the subset of the prior use data; and
  training the enterprise type model utilizing the training data.

* * * * *